US008103213B2

(12) United States Patent
Tolonen

(10) Patent No.: US 8,103,213 B2
(45) Date of Patent: Jan. 24, 2012

(54) SOFTWARE-DEFINED RADIO CONFIGURATION

(75) Inventor: Pertti Tolonen, Aatelikuja (FI)

(73) Assignee: Nokia Corporation, Espoo (FI)

( * ) Notice: Subject to any disclaimer, the term of this patent is extended or adjusted under 35 U.S.C. 154(b) by 793 days.

(21) Appl. No.: 12/203,746

(22) Filed: Sep. 3, 2008

(65) Prior Publication Data

US 2010/0056200 A1 Mar. 4, 2010

(51) Int. Cl.
*H04B 7/00* (2006.01)
*H04B 17/00* (2006.01)
*H04M 1/00* (2006.01)
*H04W 4/00* (2009.01)

(52) U.S. Cl. ... 455/39; 455/41.2; 455/67.11; 455/552.1; 370/338

(58) Field of Classification Search .... 455/552.1–553.1, 455/556.1–556.2, 39, 41.2–41.3, 67.11, 515–517; 370/338, 342, 343
See application file for complete search history.

(56) References Cited

U.S. PATENT DOCUMENTS

| | | | |
|---|---|---|---|
| 2004/0023652 A1 | 2/2004 | Shah et al. | |
| 2004/0266404 A1* | 12/2004 | Nasu et al. | 455/414.1 |
| 2005/0053094 A1 | 3/2005 | Cain et al. | |
| 2005/0094589 A1* | 5/2005 | Camp | 370/318 |
| 2006/0073804 A1 | 4/2006 | Tanaka et al. | |
| 2007/0115950 A1* | 5/2007 | Karaoguz et al. | 370/356 |
| 2007/0190938 A1* | 8/2007 | Hillyard | 455/41.1 |
| 2007/0263709 A1 | 11/2007 | Kasslin et al. | |
| 2008/0200195 A1* | 8/2008 | Abe et al. | 455/501 |
| 2008/0261605 A1* | 10/2008 | Larsen | 455/446 |

OTHER PUBLICATIONS

International Search Report for PCT/FI2009/050698 mailed Dec. 4, 2009, 7pp.

* cited by examiner

*Primary Examiner* — Simon Nguyen
(74) *Attorney, Agent, or Firm* — Locke Lord LLP

(57) ABSTRACT

A system for configuring communication resources that are at least partially based upon reconfigurable software modules. An apparatus may utilize a plurality of transports for communication, wherein the transports are supported by one or more radio modules. The one or more radio modules may comprise hardware-based radio modules and software-defined radio (SDR) modules including a reconfigurable software element that allows the radio module to emulate the functionality of multiple hardware-based radios. In accordance with at least one embodiment of the present invention, SDR modules in an apparatus may formulate a communication configuration for use in communicating with another apparatus based on remote characteristic information (e.g., information corresponding to the apparatus with which communication is desired) and local characteristic information pertaining to the apparatus.

26 Claims, 23 Drawing Sheets

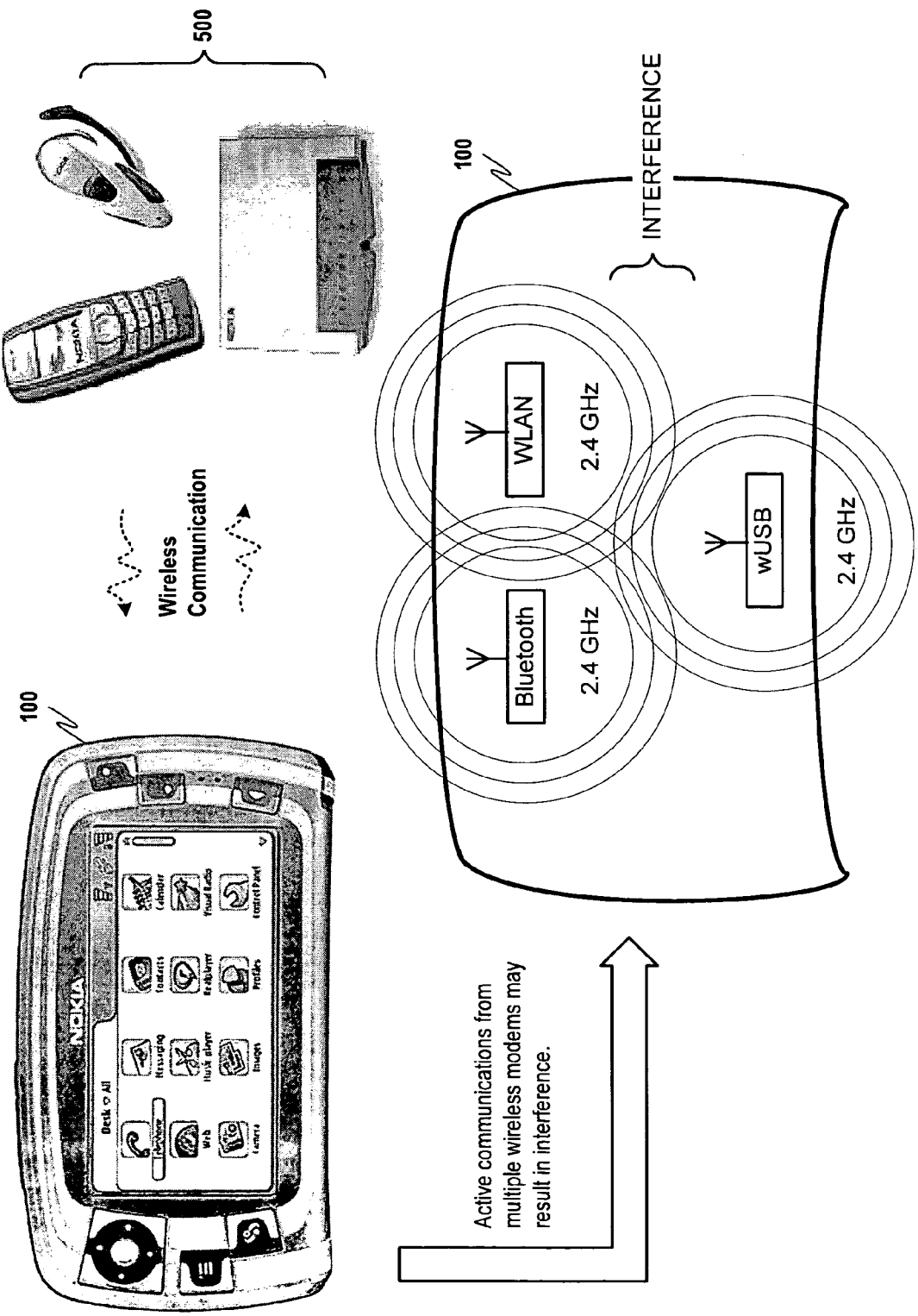

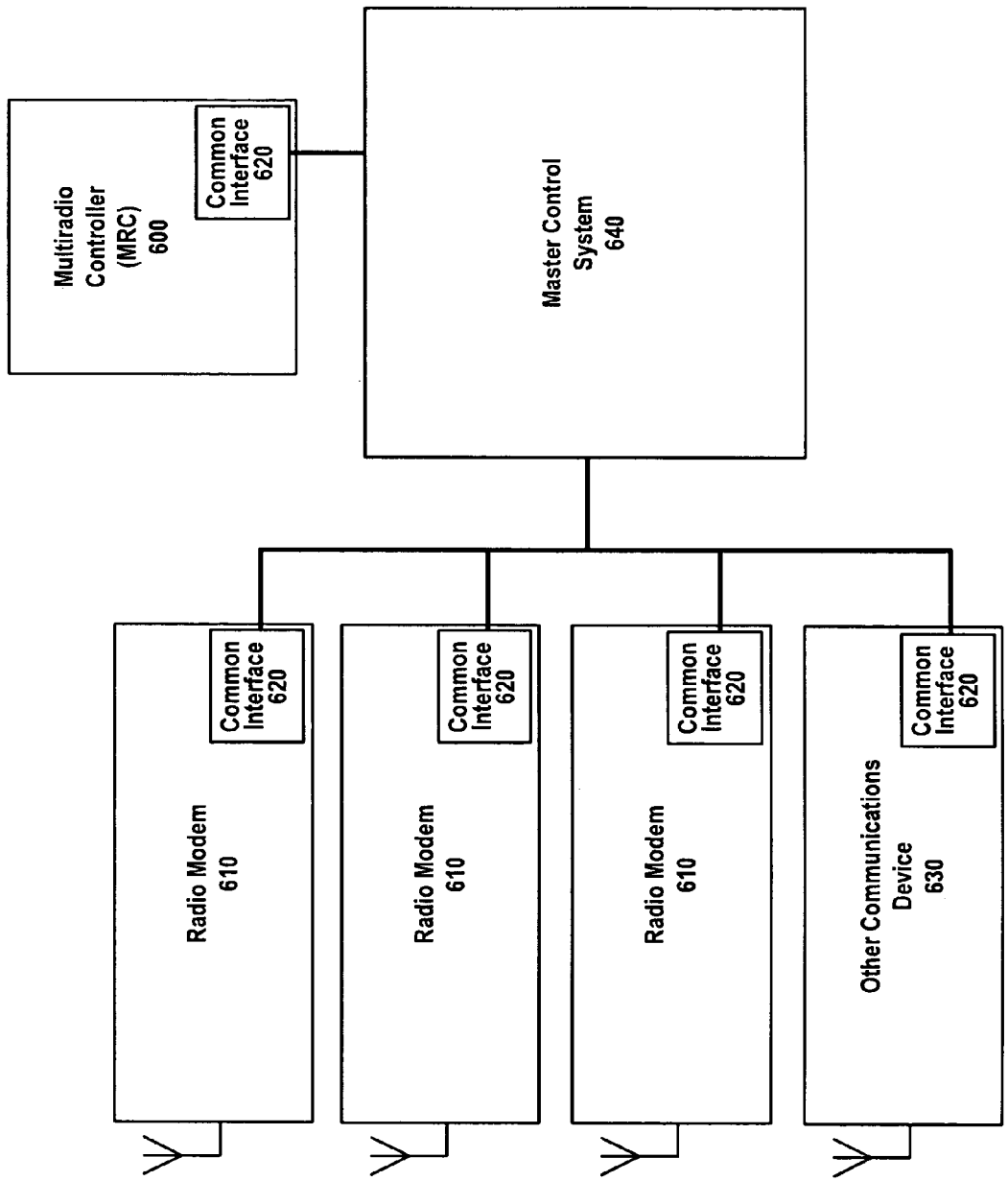

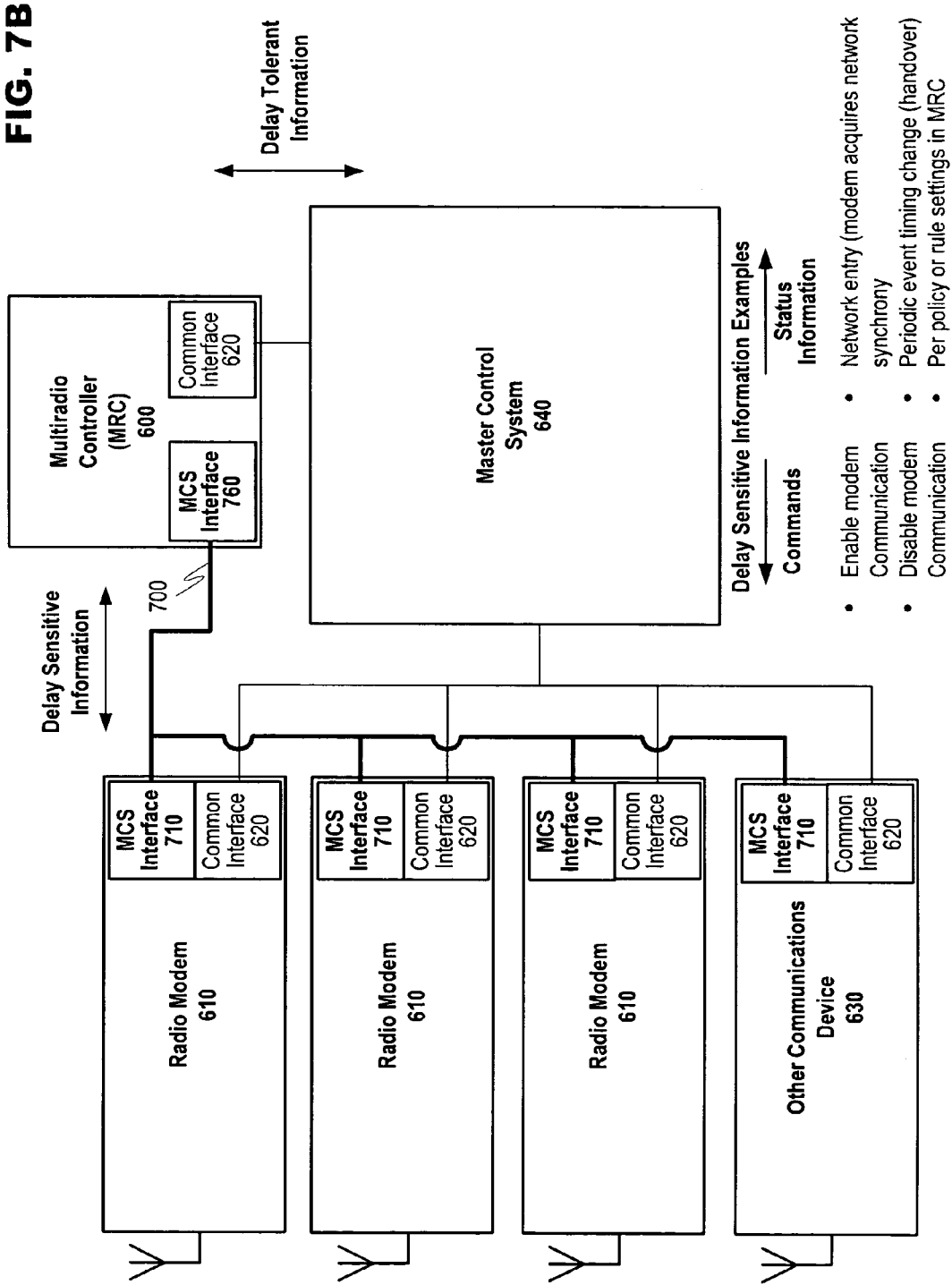

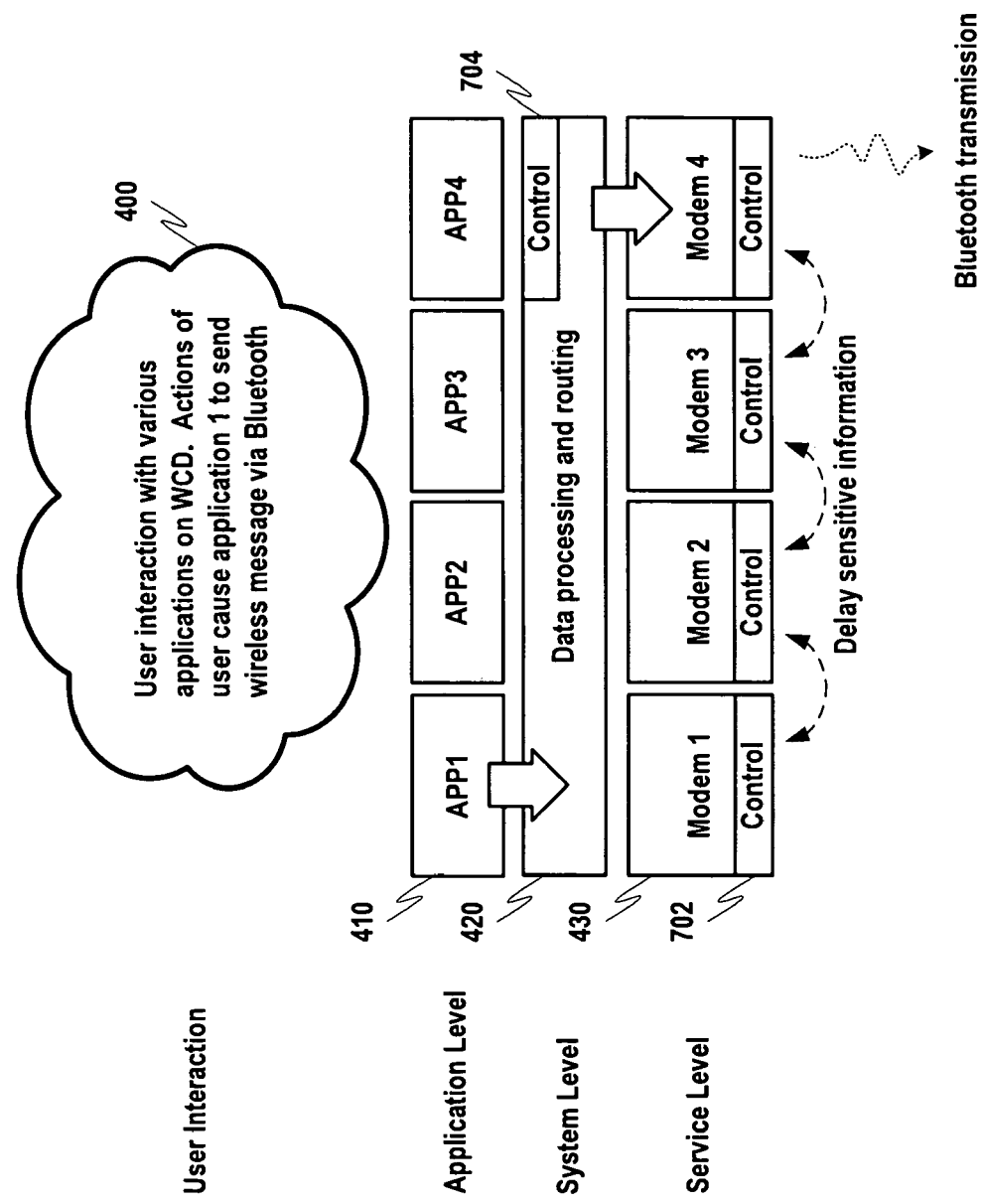

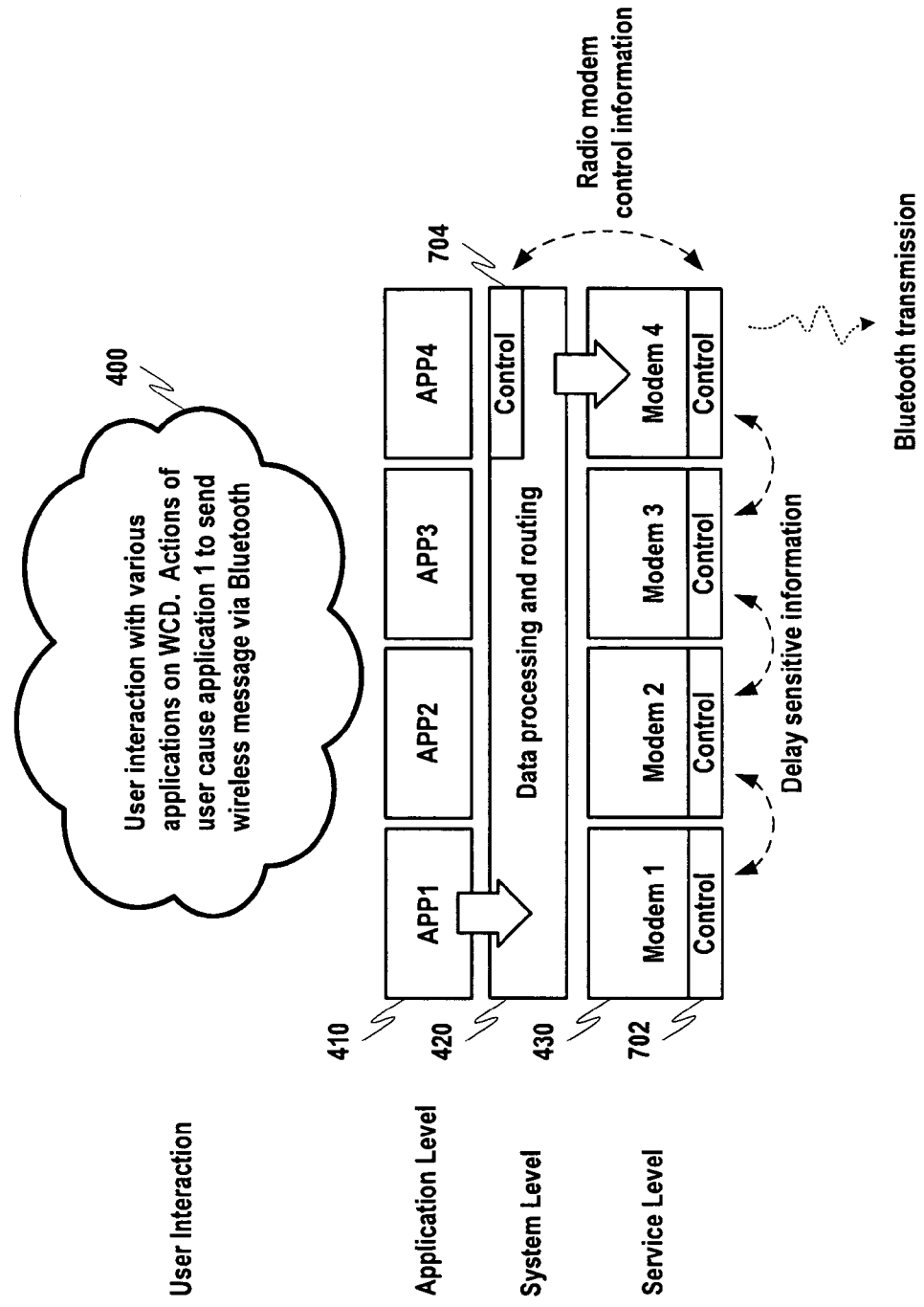

SOFTWARE-DEFINED RADIO CONFIGURATION

BACKGROUND

1. Field of Invention

The present invention relates to wireless communication, and more specifically, to a system for facilitating wireless communication connections between configurable radio devices.

2. Background

Wireless apparatuses continue to proliferate in the global marketplace due to technological improvement in both the quality of communication and device functionality. These wireless communication devices (WCDs) have become common for both personal and business use, allowing users to transmit and receive voice, text and graphical data from a multitude of geographic locations. Communication networks usable by these devices may span different frequencies and transmission distances.

For example, cellular networks may facilitate WCD communication over large geographic areas. These technologies are commonly divided by generation, starting in the 1970s-1980s with first generation (1G) analog cellular telephones that provided baseline voice communication, to modern digital handsets. GSM is an example of a widely employed 2G digital cellular network communicating in the 900 MHZ/1.8 GHZ bands in Europe and at 850 MHz and 1.9 GHZ in the United States. GSM provides voice communication and supports text transmission via the Short Messaging Service (SMS). SMS may transmit and receive text messages of up to 160 characters, while providing data transfer to packet networks, ISDN and POTS users at 9.6 Kbps, while Multimedia Messaging Service (MMS) allows for the transmission of sound, graphics and video files in addition to simple text. Emerging technologies such as Digital Video Broadcasting for Handheld Devices (DVB-H) will make streaming digital video, and other similar content, available for direct transmission to a WCD. While long-range communication networks are a well-accepted means for transmitting and receiving data, due to cost, traffic and legislative concerns, these networks may not be appropriate for all data applications.

Short-range wireless networks may provide communication solutions that avoid some of the problems seen in large cellular networks. Bluetooth™ is an example of a short-range wireless technology quickly gaining acceptance in the marketplace. A 1 Mbps Bluetooth™ radio may transmit and receives data at a rate of 720 Kbps within a range of 10 meters, and may transmit up to 100 meters with additional power boosting. Enhanced data rate (EDR) technology also available may enable maximum asymmetric data rates of 1448 Kbps for a 2 Mbps connection and 2178 Kbps for a 3 Mbps connection. A plurality of devices within operating range of each other may automatically form a network group called a "piconet". Any apparatus may promote itself to the master of the piconet, allowing it to control data exchanges with up to seven "active" slaves and 255 "parked" slaves. Active slaves may exchange data based on the clock timing of the master, while parked slaves monitor a beacon signal in order to stay synchronized with the master. These apparatuses may continually switch between active communication and power saving modes in order to transmit data to other piconet members. In addition to Bluetooth™ other popular short-range wireless networks include WLAN (of which "Wi-Fi" local access points communicating in accordance with the IEEE 802.11 standard, is an example), WUSB, UWB, ZigBee (802.15.4, 802.15.4a), and UHF RFID.

Manufacturers may also incorporate resources for providing enhanced functionality in WCDs (e.g., components and/or software for performing close-proximity wireless communication). Sensors, scanners, etc. may be utilized to read visual or electronic information into an apparatus. In an example transaction, users may hold their WCD in proximity to a target, aiming their WCD at an object (e.g., to take a picture) or sweeping the device over a printed tag or document to obtain information. These technologies include machine-readable mediums such as radio frequency identification (RFID), Infra-red (IR) communication, optical character recognition (OCR) and various other types of visual, electronic and magnetic scanning that may be utilized to quickly input desired information into the WCD without the need for manual entry by a user.

These examples of additional communication functionality may be implemented in apparatuses utilizing various combinations of hardware and/or software. For instance, one or more functions that were previously handled by discrete components (e.g., hardware-based wireless radios) may be handled by more generic software-driven processes. Moreover, the ability to reconfigure software-based modules during runtime may, in some instances, allow a software-based solution to emulate the functionality of multiple traditional hardware modules. The ability to implement flexible configuration may allow one or more hardware components to be omitted from an apparatus in favor of a software-based solution that is configurable to perform the same or similar function, while being more efficient in terms of power, space, etc.

However, problems can also spawn from the ability to reconfigure software-based modules during runtime. The runtime flexibility of software-driven solutions, while beneficial, can also increase the potential for negatively impacting (e.g., interfering with) other processes also occurring on the executing apparatus, on another apparatus with which communication is desired, etc. Further, software-based solutions must be able to interact with older discrete implementations by accounting for the limitations inherent in these hardware-based solutions.

SUMMARY

Various embodiments of the present invention are directed to at least a method, computer program product, apparatus and system for configuring communication resources that are at least partially based upon reconfigurable software modules. For example, an apparatus may utilize a plurality of transports for communication, wherein the transports are supported by one or more radio modules. The one or more radio modules may comprise hardware-based radio modules and software-defined radio (SDR) modules including a reconfigurable software element that allows the radio module to emulate the functionality of multiple hardware-based radios. In accordance with at least one embodiment of the present invention, SDR modules in an apparatus may formulate a communication configuration for use in communicating with another apparatus based on remote characteristic information (e.g., information corresponding to the apparatus with which communication is desired) and local characteristic information pertaining to the apparatus.

In an example implementation, an apparatus may desire to communicate with another apparatus. In order to configuration, the apparatus may first make an inquiry to the other device utilizing a initialization channel. Initialization channels may be, for example, predefined channels in a wireless transport that are reserved for communication establishment. The inquiry, if successfully received in the other apparatus, may prompt a response message to the inquiring apparatus, the response message including at least remote characteristic information.

Remote characteristic information may include, for example, information related to the abilities and/or status of the other apparatus, and may further incorporate environmental information concerning possible interference known to (e.g., in the case other transports that are currently being utilized), or sensed by, the other apparatus. A determination may also be made with respect to local characteristic information, wherein local characteristic information may be similar to the remote characteristic information but pertaining instead to the initiating apparatus.

The initiating apparatus may then formulate a configuration based at least upon the received remote characteristic information and the local characteristic information. In at least one embodiment of the present invention, the configuration may comprise information usable by resources in one or both of the initiating apparatus and the other apparatus for establishing a link between the apparatuses. The configuration may then be sent from the initiating apparatus to the other apparatus (e.g., via the initialization channel), wherein the configuration may be utilized for resource configuration. Similarly, the configuration information already residing on the initiating apparatus may also be utilized for configuring resources. The resulting resource configuration in each apparatus allows for the establishment of communication between the apparatuses, wherein the communication takes into account the condition of each apparatus.

The foregoing summary includes example embodiments of the present invention that are not intended to be limiting. The above embodiments are used merely to explain selected aspects or steps that may be utilized in implementations of the present invention. However, it is readily apparent that one or more aspects, or steps, pertaining to an example embodiment can be combined with one or more aspects, or steps, of other embodiments to create new embodiments still within the scope of the present invention. Therefore, persons of ordinary skill in the art would appreciate that various embodiments of the present invention may incorporate aspects from other embodiments, or may be implemented in combination with other embodiments.

DESCRIPTION OF DRAWINGS

Various embodiments of the present invention may be understood in view of the following configuration examples taken in conjunction with the drawings, wherein:

FIG. 5 discloses an operational example wherein interference may occur during the concurrent operation of multiple radio modems within the same apparatus.

FIG. 6B discloses a more detailed structural representation of FIG. 6A including the multiradio controller and the radio modems.

FIG. 7B discloses a more detailed structural representation of FIG. 7A including the multiradio control system and the radio modems.

FIG. 8C discloses an operational example of a wireless communication device including a distributed multiradio control system in accordance with at least one embodiment of the present invention.

FIG. 9C discloses an operational example of a wireless communication device including a distributed multiradio control system in accordance with the alternative embodiment of the present invention disclosed in FIG. 9A.

DESCRIPTION OF EXAMPLE EMBODIMENTS

While the present invention has been described herein in terms of a variety of embodiment examples, changes can be made therein without departing from the spirit and scope of the invention, as set forth in the appended claims.

I. Wireless Communication Over Different Communication Networks

Figure 1:
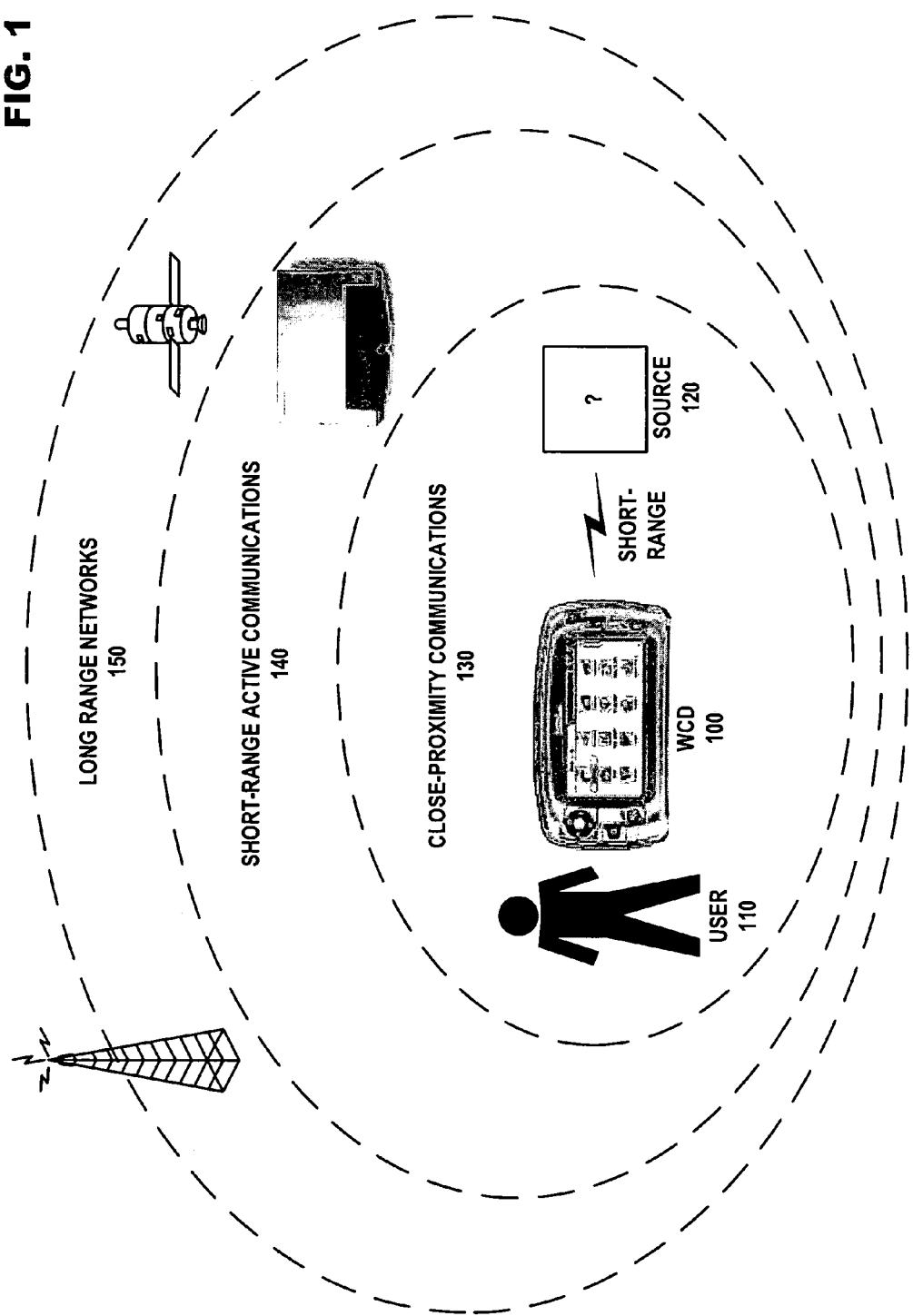
FIG. 1 discloses an example of a wireless operational environment, including wireless transports having different effective ranges.

Wireless communication devices may transmit and receive information over a wide array of wireless communication networks, each with different advantages regarding speed, range, quality (error correction), security (encoding), etc. These characteristics may dictate, for example, the amount of information that can be transferred to a receiving apparatus, and the duration of the information transfer. FIG. 1 includes an example of a WCD and how it may interact with various types of wireless networks.

In FIG. 1, user 110 possesses WCD 100. The apparatus shown is a high functionality portable device, however, usable apparatuses span a range from basic cellular handsets to more wirelessly enabled palmtop or laptop computers. Close-proximity communication 130 may include close proximity inter-apparatus communication or transponder-type interactions wherein only the scanning device may require a power source. In example transponder interaction, WCD 100 may scan source 120 via short-range communication. A transponder in source 120 may use the energy and/or clock signal contained within the scanning signal, as in the case of RFID communication, to respond with data stored in the transponder. Machine readable technologies may have an effective transmission range on the order of ten feet, and may be able to deliver stored data in amounts from a bit to over a megabit (or 125 Kbytes) relatively quickly. These characteristics make such technologies well suited for identification purposes, such as in receiving an account number for a public transportation provider, a key code for an automatic electronic door lock, an account number for a credit or debit transaction, etc.

The transmission range between two apparatuses may be extended if both device can participate in powered communication using more robust wireless transports. Short-range active communication 140 may include applications wherein the sending and receiving devices are both active. An example situation would include user 110 coming within effective transmission range of a Bluetooth™, WLAN, UWB, WUSB, etc. access point. In the case of Bluetooth™, a network may automatically be established to transmit information to WCD 100 possessed by user 110. The amount of information that can be conveyed is unlimited, except that it must all be transferred in the time when user 110 is within effective transmission range of the access point. The higher complexity attributed to these wireless transports means that additional time may be required when establishing an initial connection to WCD 100, which may be increased if a large number of devices are queued for service in the area proximate to the access point. The transmission range of these transports may vary depending on the technology and may, for example, extend from 30 ft. to over 300 ft. with additional power boosting.

Long-range networks 150 may be used to provide virtually uninterrupted communication coverage for WCD 100. Land-based radio stations or satellites may be used to relay various communication transactions worldwide. While these systems are extremely functional, the use of these systems is often charged on a per-minute basis to user 110, not including additional charges for data transfer (e.g., wireless Internet access). Further, the regulations covering these systems may cause additional overhead for both the users and providers, making the use of these systems more cumbersome.

II. Wireless Communication Device

As previously described, various embodiments of the present invention may be implemented using a variety of wireless communication equipment. Therefore, it is important to understand the communication tools available to user 110 before exploring the present invention. For example, in the case of a cellular telephone or other handheld wireless devices, the integrated data handling capabilities of the device play an important role in facilitating transactions between the transmitting and receiving devices.

Figure 2:
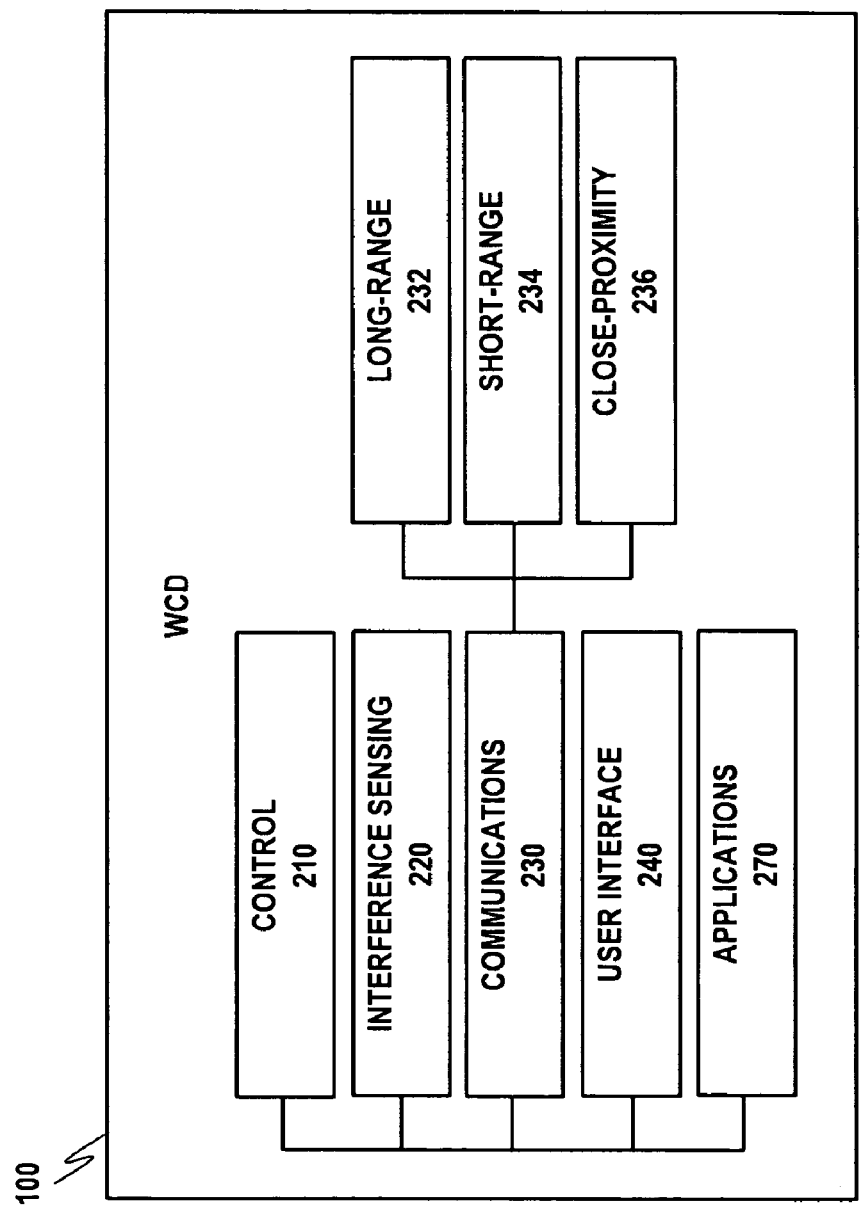
FIG. 2 discloses a modular example of a wireless communication device that may be usable in accordance with at least one embodiment of the present invention.

FIG. 2 discloses an example of a modular layout for an apparatus usable with the present invention. WCD 100 is broken down into modules representing the functional aspects of the device. These functions may be performed by the various combinations of software and/or hardware components discussed below.

Control module 210 may regulate the operation of the apparatus. Inputs may be received from various other modules included within WCD 100. For example, interference sensing module 220 may use various techniques to detect any sources of environmental interference within transmission range of the apparatus. Control module 210 may interpret this data, and in response, may control other modules in WCD 100.

Communications module 230 may incorporate all of the communication aspects of WCD 100. As shown in FIG. 2, communications module 230 may include, for example, long-range communications module 232, short-range communications module 234 and close-proximity module 236. Communications module 230 may utilize one or more of these sub-modules to receive a multitude of different types of communication from both local and long distance sources, and to transmit data to recipient devices within the transmission range of WCD 100. Communications module 230 may be triggered by control module 210, or by control resources local to the module responding to sensed messages, environmental influences and/or other devices in proximity to WCD 100.

User interface module 240 may comprise visual, audible and tactile components (e.g., hardware and/or software) that allow user 110 to receive data from, and enter data into, the device. For instance, data entered by user 110 may be interpreted by control module 210 to affect the behavior of WCD 100. User-inputted data may also be transmitted by communications module 230 to other devices within effective transmission range. Other devices in transmission range may also send information to WCD 100 via communications module 230, and control module 210 may cause this information to be transferred to user interface module 240 for presentment to the user.

Applications module 250 may comprise other hardware and/or software applications on WCD 100. These applications may include sensors, interfaces, utilities, interpreters, data applications, etc., and may be invoked by control module 210 to read information provided by the various modules, and in turn, may supply information to requesting modules in WCD 100.

Figure 3:
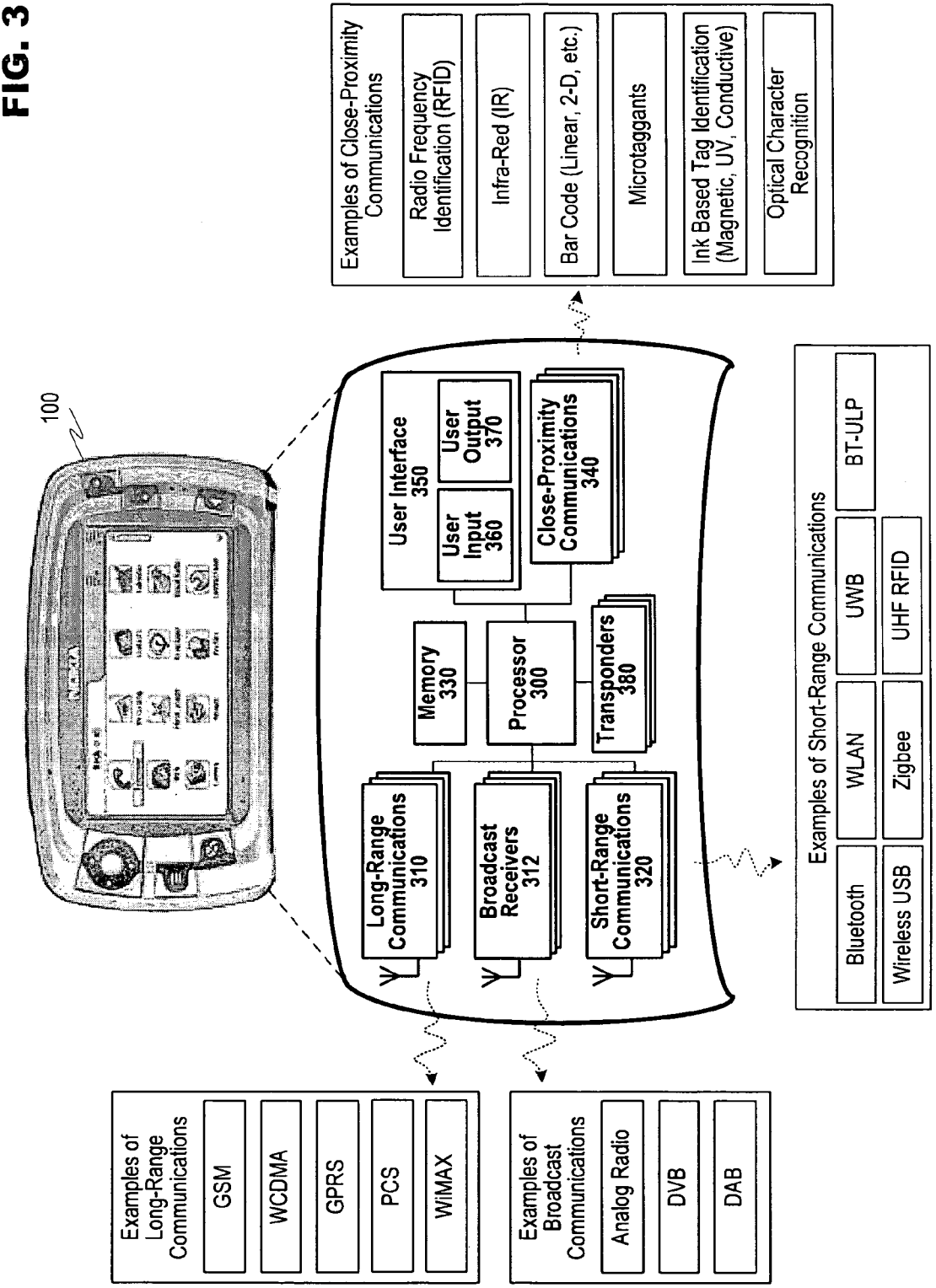
FIG. 3 discloses a structural representation of the example previously described with respect to FIG. 2.

In accordance with at least one embodiment of the present invention, FIG. 3 discloses an example of a structural layout usable in implementing the functionality of the modular system previously described with respect to FIG. 2. Processor 300 may control overall device operation. As shown in FIG. 3, processor 300 may be coupled to one or more communications sections 310, 320 and 340. Processor 300 may further be implemented utilizing one or more microprocessors that are each capable of executing software instructions stored in memory 330.

Memory 330 may include various types of random access memory (RAM), read only memory (ROM). Examples of usable memory types may include, for example, fixed computer readable media such electronic components and/or modules in stalled in the apparatus. Further, removable computer-readable medium on which computer executable code is embodied or recorded may be considered part of memory 330. Removable media may include electronic (e.g., Flash), magnetic (e.g., removable disks, drives, etc.), optical (e.g., CD-ROM, DVD, etc.) media, or any other technology that may be configured to store information in the form of data and software components (also referred to as modules). Data stored by memory 330 may be associated with particular software components. In addition, this data may be associated with databases, such as a bookmark database or a business database for scheduling, email, etc.

The software components stored by memory 330 include instructions that can be executed by processor 300. Various types of software components may be stored in memory 330. For instance, memory 330 may store software components that control the overall operation of WCD 100 (e.g., in the form of an operating system) and may also include more specialized software modules configured to manage particular functions such as communication sections 310, 320 and 340. Application-related software modules may also be stored in Memory 330. Examples of these software components may include a firewall, a service guide manager, a bookmark database, user interface manager, user-installed applications and communication utilities modules required to support WCD 100.

Long-range communications 310 may manage functionality related to the wireless exchange of information over large geographic areas (such as cellular networks) via an antenna. Communication transactions may be conducted using technologies from the previously described 1G to 3G. In addition to basic voice communication (e.g., via GSM), long-range communications 310 may operate to establish data communication sessions, such as General Packet Radio Service (GPRS) sessions and/or Universal Mobile Telecommunications System (UMTS) sessions. Also, long-range communications 310 may operate to transmit and receive messages, such as short messaging service (SMS) messages and/or multimedia messaging service (MMS) messages.

As a subset of long-range communications 310, or alternatively operating as an independent module separately connected to processor 300, transmission receiver 312 may allow WCD 100 to receive transmission messages via mediums such as Digital Video Broadcast for Handheld Devices (DVB-H). In at least one example scenario, transmissions may be encoded so that only certain receiving devices may access the transmission content, and may contain text, audio or video information. Further, WCD 100 may receive these transmissions and use information contained within the transmission signal to determine if the device is permitted to view the received content.

Short-range communications 320 is responsible for functions involving the exchange of information across short-range wireless networks. As described above and in FIG. 3, examples of wireless transports that may be categorized under short-range communications 320 are not limited to Bluetooth™, WLAN, UWB Ultra-Low Power Bluetooth™ (ULP-BT), wireless USB, Zigbee and Ultra High Frequency Radio Frequency communication (UHF RFID). Accordingly, short-range communications 320 performs functions related to the establishment of short-range connections, as well as processing related to the transmission and reception of information via such connections.

Close-proximity communications 340 may provide functionality related to the short-range scanning of machine-readable data. Near Field Communication, or NFC, apparatuses may be included in this category. For example, processor 300 may control components in close-proximity communication 340 to generate RF signals for activating an RFID transponder, and may in turn control the reception of signals from an RFID transponder. Other short-range scanning methods for reading machine-readable data that may be supported by the close-proximity 340 are not limited to IR communication, linear and 2-D (e.g., QR) bar code readers (including processes related to interpreting UPC labels), and optical character recognition devices for reading magnetic, UV, conductive or other types of coded data that may be provided in a tag using suitable ink. To support the scanning of machine-readable data by close-proximity communications 340, WCD 100 may, for example, incorporate components such as optical detectors, magnetic detectors, CCDs or other sensors known in the art for interpreting machine-readable information.

As further shown in FIG. 3, user interface 350 may also be coupled to processor 300. User interface 350 facilitates the exchange of information with a user. The example of FIG. 3 discloses a user interface 350 that includes a user input 360 and a user output 370. User input 360 may include one or more components that allow user 110 to input information. Examples of such components include keypads, touch screens, and microphones. User output 370 allows a user to receive information from the device. Thus, user output portion 370 may include various components, such as a display, light emitting diodes (LED), tactile emitters and one or more audio speakers. Example displays include liquid crystal displays (LCDs), and other video displays.

WCD 100 may further include one or more transponders 380. A transponder may essentially comprise a passive device that may be programmed by processor 300 with information to be delivered in response to a scan from an outside source. For example, an RFID scanner mounted in an entryway may continuously emit radio frequency waves. When a person with a device containing transponder 380 walks through the door, the transponder may be energized, causing it to respond with information identifying the device, the person, etc. In addition, scanners can be mounted (e.g., as previously discussed with regard to examples of close-proximity communications 340) in WCD 100 so that it can read information from other transponders in the vicinity.

Hardware corresponding to communications sections 310, 312, 320 and 340 provide for the transmission and reception of signals. Accordingly, these portions may include components (e.g., electronics) that perform functions, such as modulation, demodulation, amplification, and filtering. These portions may be locally controlled, or controlled by processor 300 in accordance with software communication components stored in memory 330. The elements of FIG. 3 may further be constituted and/or coupled in accordance with various techniques in order to produce the functionality described in FIG. 2. In one example configuration, processor 300, communications sections 310, 312 and 320, memory 330, close-proximity communications 340, user interface 350, transponder 380, etc. may comprise separate components that are coupled together via one or more wired and/or wireless bus interfaces. Alternatively, any or all individual components may be replaced by integrated circuits in the form of a programmable logic device, gate array, ASIC, multi-chip module, etc. that may be programmed to replicate the functions of the stand-alone devices. In addition, each of these components may be coupled to a power source, such as a removable and/or rechargeable battery (not shown).

User interface 350 may allow user 110 to interact with various software components installed on the apparatus (e.g., contained in memory 330). The software components may, for example, provide functionality such as operating system modules, applications for productivity, entertainment, etc., communication utilities for supporting long-range communications 310, short-range communications 320, close-proximity communications 340, etc. Software components may include routines that, for example, may be configured to provide data processing, routing, transmission, reception, etc. Various programming mediums/languages may be used (Wireless Application (WAP), Hypertext Markup Language (HTML) variants like Compact HTML (CHTML), etc.)

III. Example Operation of a Wireless Communication Device Including Potential Interference Problems Encountered.

Figure 4:
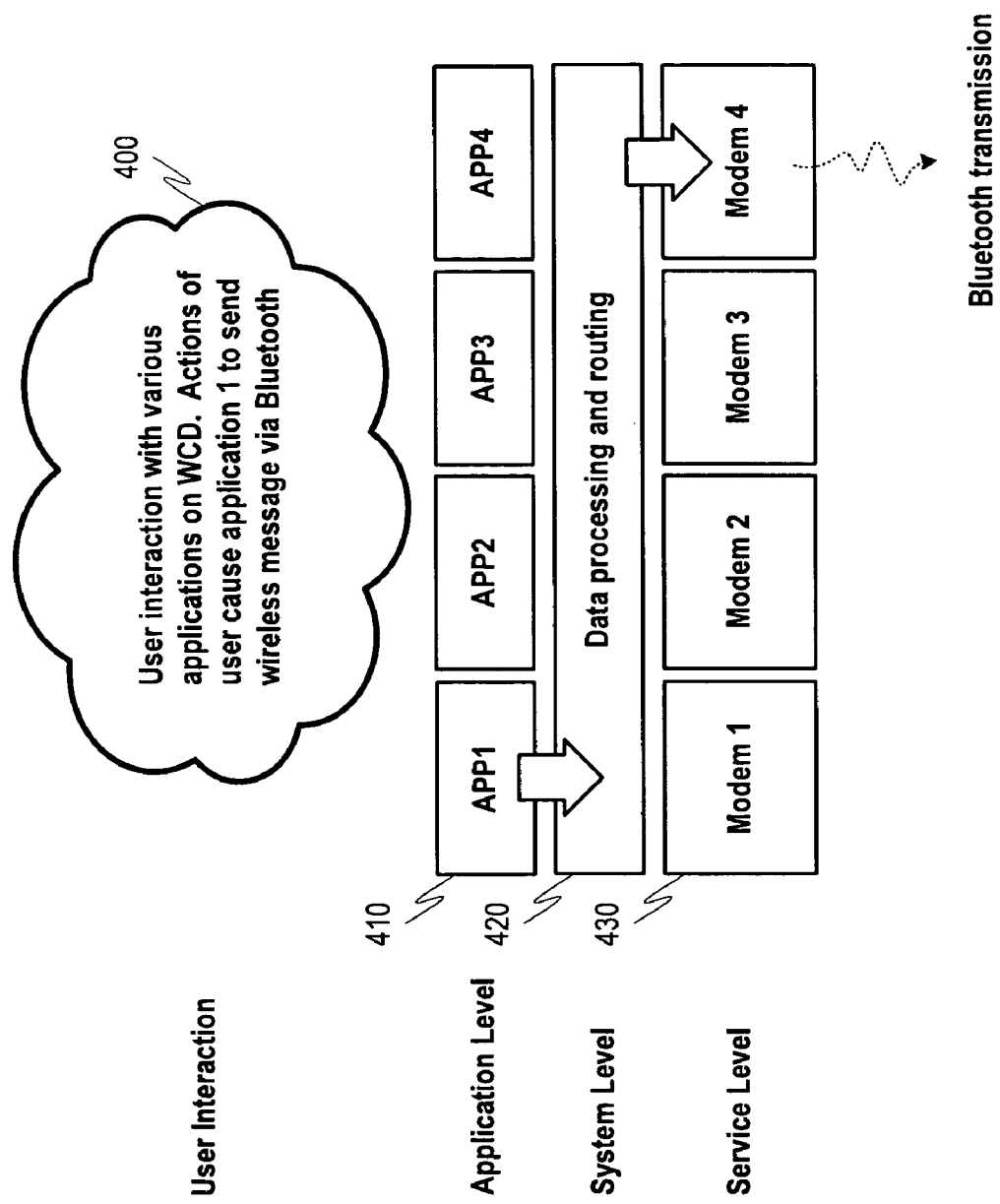
FIG. 4 discloses an operational example of communication utilizing a wireless transport in accordance with at least one embodiment of the present invention.

FIG. 4 discloses an example of a process stack, in accordance with at least one embodiment of the present invention, for use in explaining operation of an apparatus. At the top level 400, user 110 interacts with WCD 100. This example involves user 110 entering information via user input 360 and receiving information from user output 370 in order to activate functionality in application level 410. In the application level, programs related to specific functionality within the device interact with both the user and the system level. These programs include applications for visual information (e.g., web browser, DVB-H receiver, etc.), audio information (e.g., cellular telephone, voice mail, conferencing software, DAB or analog radio receiver, etc.), recording information (e.g., digital photography software, word processing, scheduling, etc.) or other information processing. Actions initiated in application level 410 may require information to be sent from, or received into, WCD 100. In FIG. 4, the transmission of data to a recipient apparatus via Bluetooth™ is being requested. As a result, application level 410 may then call resources in the system level to initiate the required processing and routing of data.

System level 420 may process and route data requests for transmission. Processing may include, for example, the calculation, translation, conversion and/or packetizing the data. The data may then be routed to an appropriate communication resource in the service level. If the desired communication resource is active and available in the service level 430, the packets may be routed to a radio modem for delivery via wireless transmission. In some configurations radio modems may comprise support hardware and/or software in addition to the actual modem component, and therefore, radio modems may interchangeably be referred to as radio modules herein. Apparatuses usable in implementing various embodiments of the present invention may include a plurality of these radio modules that are configured to operate using different wireless mediums. In FIG. 4, "modem 4" may be activated and able to send packets using Bluetooth™ communication. However, a radio module (as a hardware resource) need not be dedicated to a specific wireless medium, and may be used for different types of communication depending on the requirements of the wireless transport and the hardware characteristics of the radio modem or module.

FIG. 5 discloses a situation wherein the above described example operational process may cause more than one radio modem to become active. In this example, WCD 100 may both transmit and receive information via a multitude of transports in order to interact with various secondary devices such as those grouped at 500. For example, secondary devices may include cellular handsets communicating via long-range wireless communication like GSM, wireless headsets communicating via Bluetooth™, Internet access points communicating via WLAN, etc.

Problems may occur when some or all of these communications occur simultaneously. As further shown in FIG. 5, multiple modems operating simultaneously may cause interference for each other. Such a situation may be encountered when WCD 100 is communicating with more than one external device (as previously described). In an extreme example, devices simultaneously communicating via Bluetooth™, WLAN and wireless USB would encounter substantial overlap since all of these wireless transports operate in the 2.4 GHz band. The interference, shown as an overlapping portion of the fields depicted in FIG. 5, would cause packets to be lost and the need for retransmission of these lost packets. Retransmission requires that future time slots be used to retransmit lost information, and therefore, overall communication performance will at least be reduced, if the signal is not lost completely. The present invention, in accordance with at least one embodiment, seeks to manage problematic situations where possibly conflicting communications may occur simultaneously so that interference is minimized or avoided, resulting in increased speed and Quality of Service (QoS).

IV. A Wireless Communication Device Including a Multiradio Controller

Figure 6A:
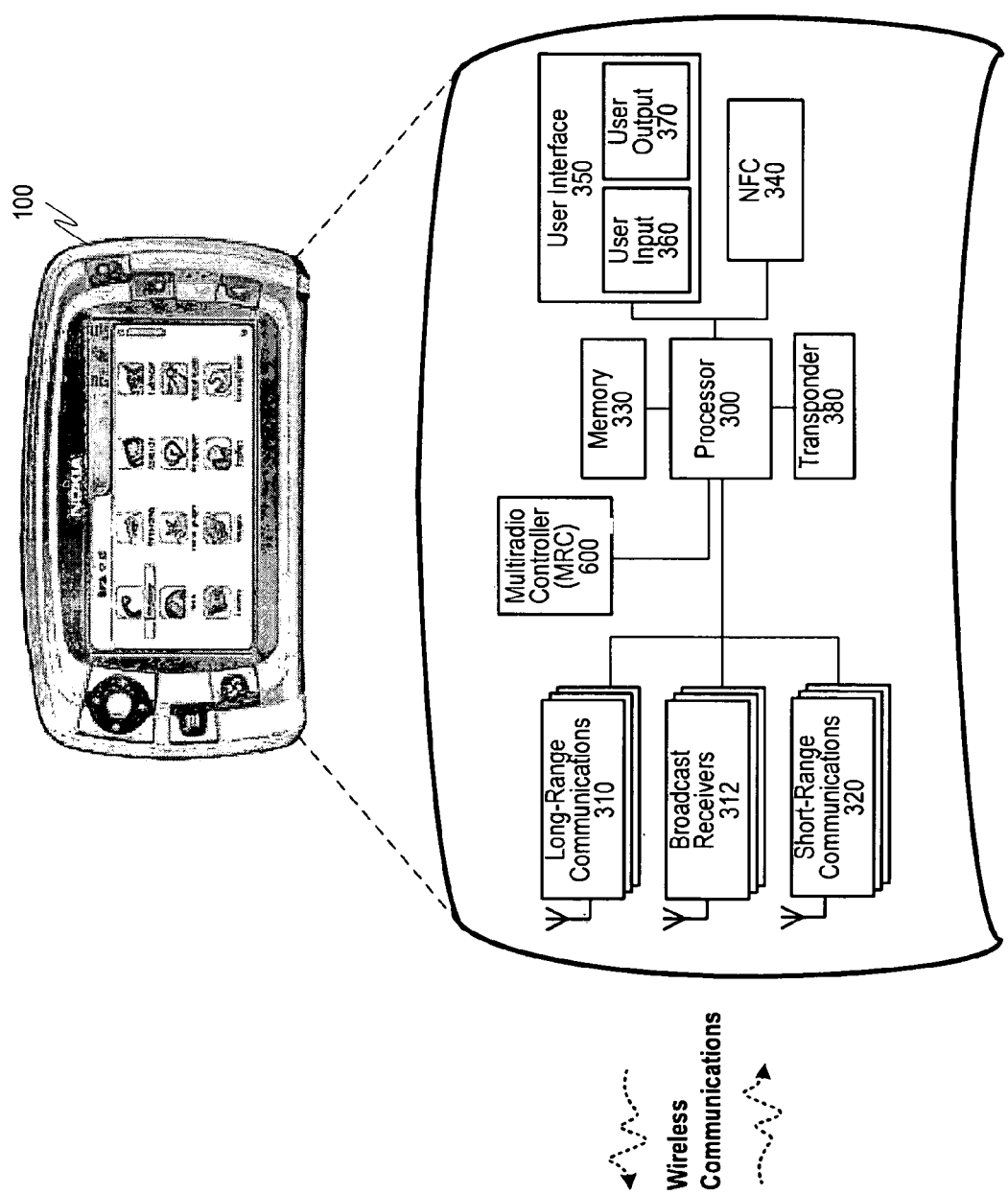
FIG. 6A discloses a structural example of a wireless communication device including a multiradio controller in accordance with at least one embodiment of the present invention.

In an attempt to better manage communication in WCD 100, a controller dedicated to managing wireless communication may be introduced. WCD 100, as shown in FIG. 6A, includes a multiradio controller (MRC) 600 in accordance with at least one embodiment of the present invention. MRC 600 may be coupled to the master control system of WCD 100, enabling MRC 600 to communicate with radio modems or other similar devices in communications modules 310 312, 320 and 340 within WCD 100.

FIG. 6B discloses in detail at least one embodiment of WCD 100, which may include multiradio controller (MRC) 600 introduced in FIG. 6A in accordance with at least one embodiment of the present invention. MRC 600 includes common interface 620 by which information may be sent or received through master control system 640. As set forth above, radio modems 610 and other devices 630 may also be referred to as "modules" in this disclosure as they may contain supporting hardware and/or software resources in addition to the modem itself. These resources may include control, interface and/or processing resources. Radio modems 610 or similar communication devices 630 (e.g., an RFID scanner for scanning machine-readable information) may include some sort of common interface 620 for communicating with master control system 640. As a result, all information, commands, etc. occurring between radio modems 610, similar devices 630 and MRC 600 are conveyed by the communication resources of master control system 640. The possible effect of sharing communication resources with all the other functional modules within WCD 100 will be discussed with respect to FIG. 6C.

Figure 6C:
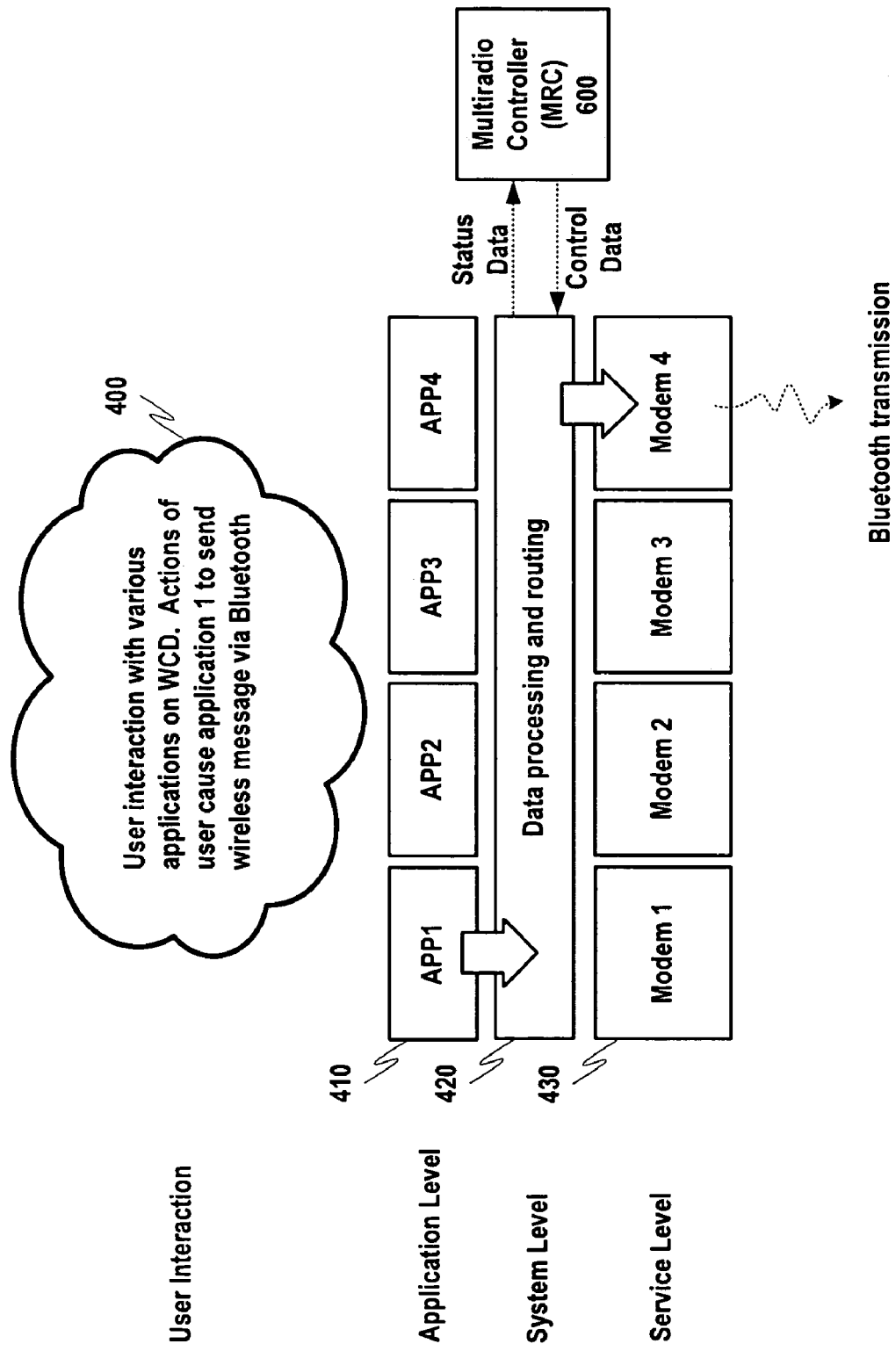
FIG. 6C discloses an operational example of a wireless communication device including a multiradio controller in accordance with at least one embodiment of the present invention.

FIG. 6C discloses an operational diagram similar to FIG. 4 including the effect of MRC 600 in accordance with at least one embodiment of the present invention. In this system MRC 600 may receive operational data from the master operating system of WCD 100, concerning for example applications running in application level 410, and status data from the various radio communication devices in service level 430. MRC 600 may use this information to issue scheduling commands to the communication devices in service level 430 in an attempt to avoid communication problems. However, problems may occur when the operations of WCD 100 are fully employed. Since the various applications in application level 410, the operating system in system level 420, the communication devices in service level 430 and MRC 600 must all share the same communication system, delays may occur when all aspects of WCD 100 are trying to communicate on the common interface system 620. As a result, delay sensitive information regarding both communication resource status information and radio modem 610 control information may become delayed, nullifying any beneficial effect from MRC 600. Therefore, a system better able to handle the differentiation and routing of delay sensitive information is required if the beneficial effect of MRC 600 is to be realized.

V. A Wireless Communication Device Including a Multiradio Control System.

Figure 7A:
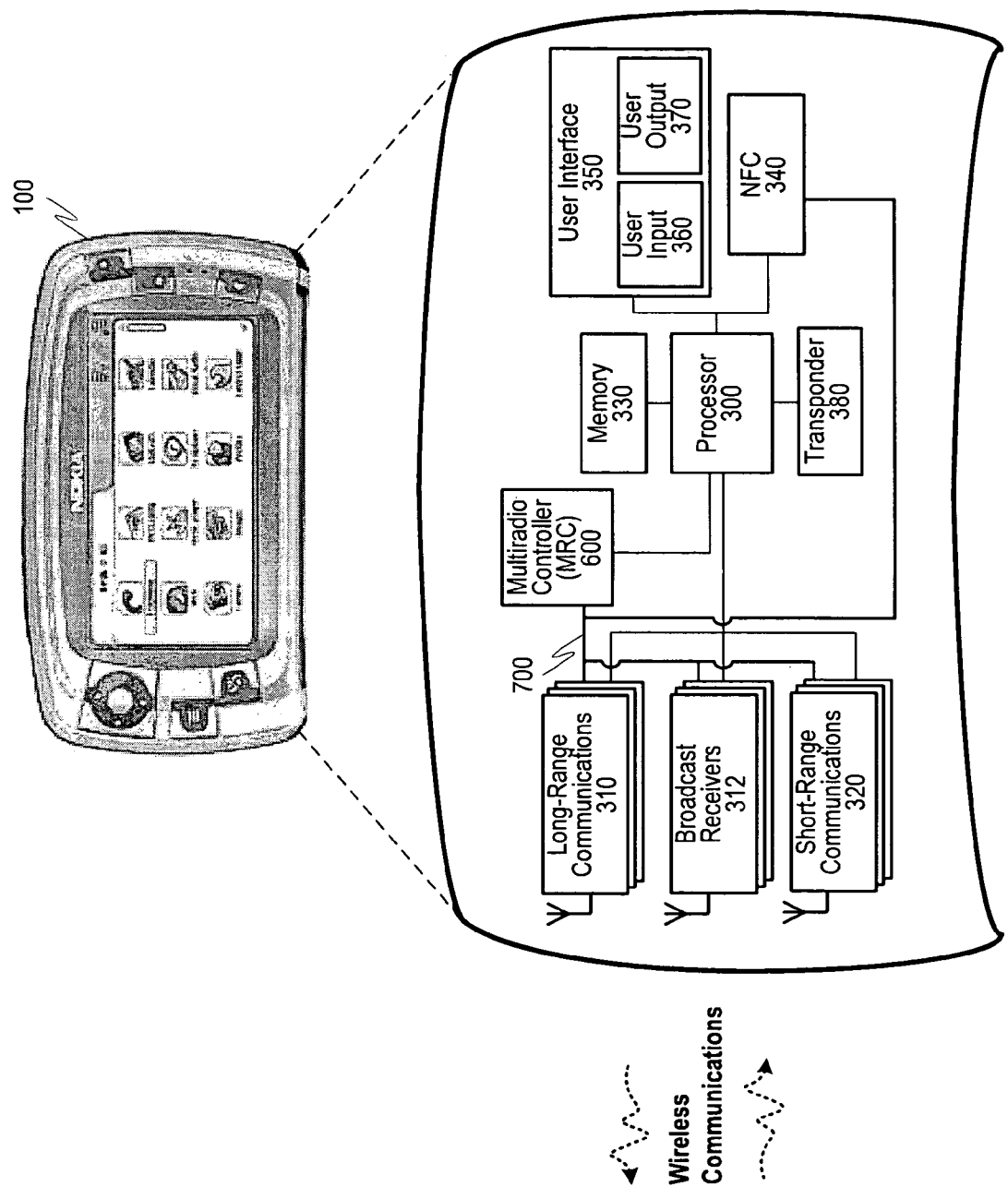
FIG. 7A discloses a structural example of a wireless communication device including a multiradio control system in accordance with at least one embodiment of the present invention.

In accordance with at least one embodiment of the present invention, FIG. 7A introduces MRC 600 as part of multiradio control system (MCS) 700. MCS 700 may directly link communication resources in modules 310, 312, 320 and 340 to MRC 600. In this way, MCS 700 may be configured to provide a dedicated low-traffic communication structure for carrying delay sensitive information both to and from MRC 600.

Additional detail is shown in FIG. 7B. MCS 700 forms a direct link between MRC 600 and the communication resources of WCD 100. This link may be established by a system of dedicated MCS interfaces 710 and 760. For example, MCS interface 760 may be coupled to MRC 600. MCS Interfaces 710 may connect radio modems 610 and other similar communication devices 630 to MCS 700 in order to form an information conveyance for allowing delay sensitive information to travel to and from MRC 600. Therefore, MRC 600 operation may no longer be influenced by the processing load of master control system 640. As a result, any information still communicated by master control system 640 to and from MRC 600 may be deemed delay tolerant, and therefore, the actual arrival time of this information does not substantially influence system performance. On the other hand, all delay sensitive information is directed to MCS 700, and therefore is insulated from the loading of the master control system.

Figure 7C:
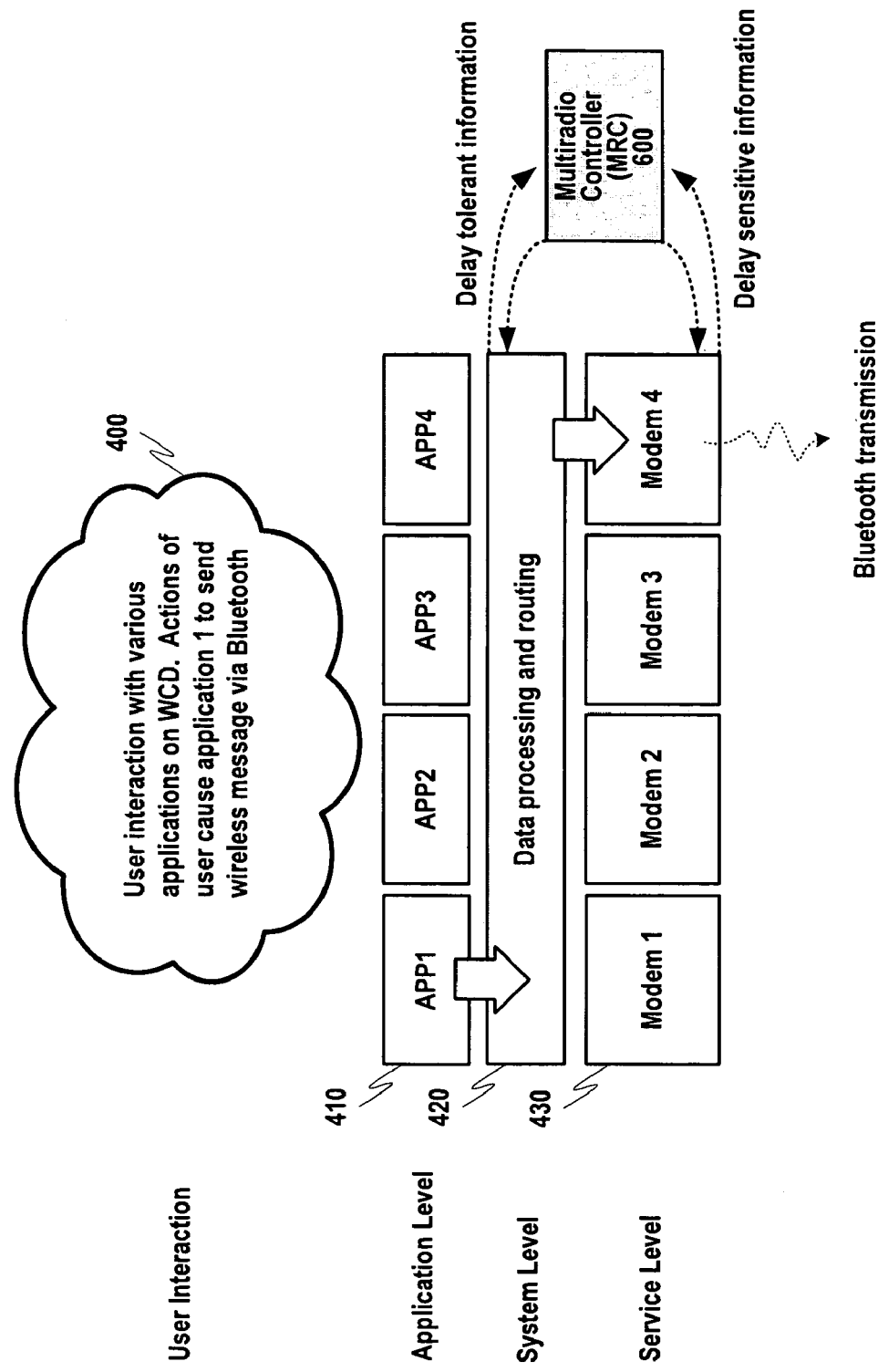
FIG. 7C discloses an operational example of a wireless communication device including a multiradio control system in accordance with at least one embodiment of the present invention.

The effect of MCS 700 is seen in FIG. 7C in accordance with at least one embodiment of the present invention. Information may now be received in MRC 600 from at least two sources. System level 420 may continue to provide information to MRC 600 through master control system 640. In addition, service level 430 may specifically provide delay sensitive information conveyed by MCS 700. MRC 600 may distinguish between these two classes of information and act accordingly. Delay tolerant information may include information that typically does not change when a radio modem is actively engaged in communication, such as radio mode information (e.g., GPRS, Bluetooth™, WLAN, etc.), priority information that may be defined by user settings, the specific service the radio is driving (QoS, real time/non real time), etc. Since delay tolerant information changes infrequently, it may be delivered in due course by master control system 640 of WCD 100. Alternatively, delay sensitive (or time sensitive) information includes at least modem operational information that frequently changes during the course of a wireless connection, and therefore, requires immediate update. As a result, delay sensitive information may need to be delivered directly from the plurality of radio modems 610 through the MCS interfaces 710 and 760 to MRC 600, and may include radio modem synchronization information. Delay sensitive information may be provided in response to requests by MRC 600, or may be delivered as a result of a change in radio modem settings during transmission as discussed below with respect to synchronization.

VI. A Wireless Communication Device Including a Distributed Multiradio Control System.

Figure 8A:
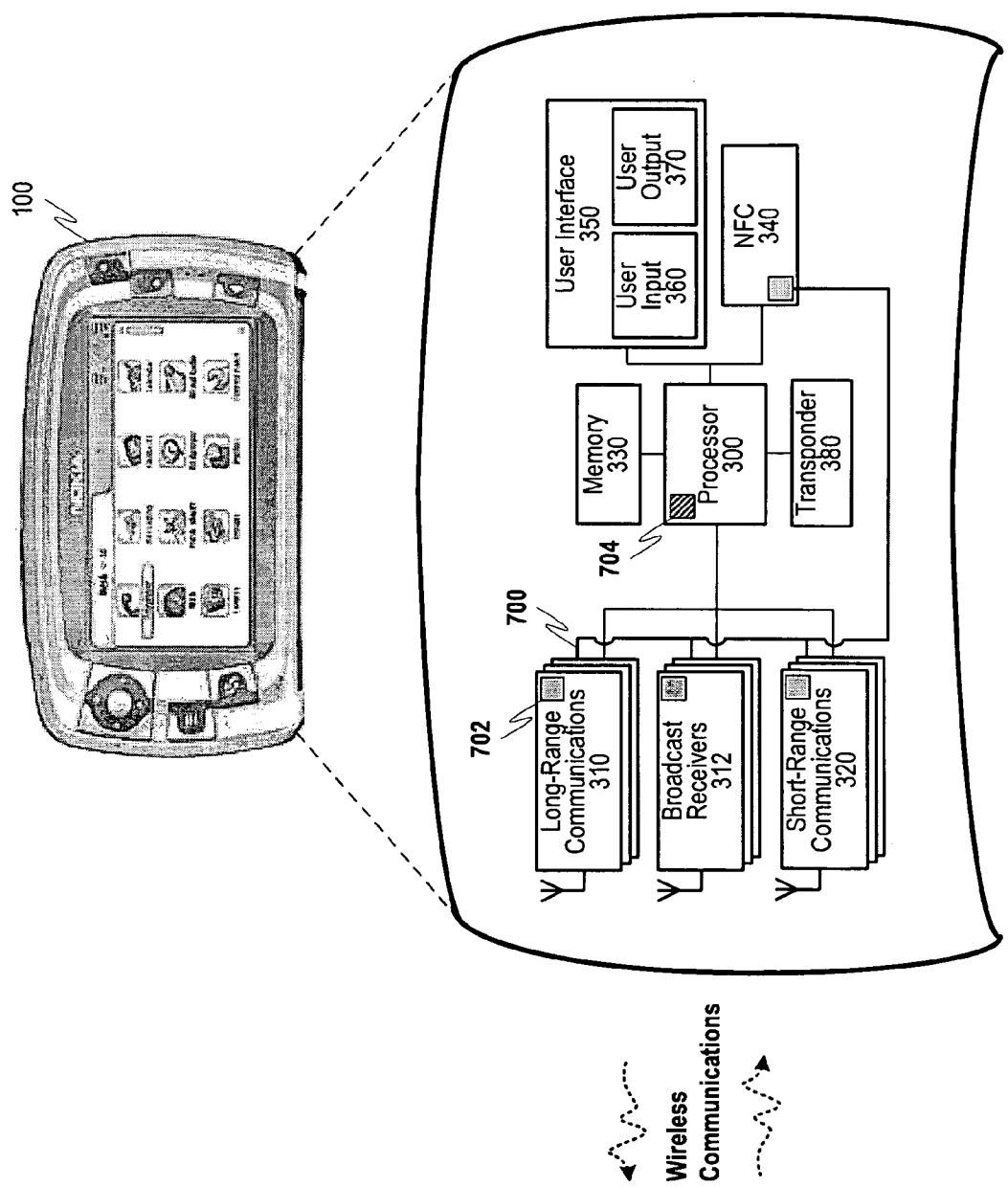
FIG. 8A discloses a structural example of a wireless communication device including a distributed multiradio control system in accordance with at least one embodiment of the present invention.

FIG. 8A discloses an alternative configuration in accordance with at least one embodiment of the present invention, wherein a distributed multiradio control system (MCS) 700 is introduced into WCD 100. Distributed MCS 700 may, in some cases, be deemed to provide an advantage over a centralized MRC 600 by distributing these control features into already necessary components within WCD 100. As a result, a substantial amount of the communication management operations may be localized to the various communication resources, such as radio modems (modules) 610, reducing the overall amount of control command traffic in WCD 100.

MCS 700, in this example, may be implemented utilizing a variety of bus structures, including the I²C interface commonly found in portable electronic devices, as well as emerging standards such as SLIMbus that are now under development. I²C is a multi-master bus, wherein multiple devices can be connected to the same bus and each one can act as a master through initiating a data transfer. An I²C bus contains at least two communication lines, an information line and a clock line. When an apparatus has data to transmit, it assumes a master role and transmits both its clock signal and information to a recipient device. On the other hand, SLIMbus uses a separate, non-differential physical layer that runs at rates of 50 Mbits/s or slower over just one lane. It is being developed by the Mobile Industry Processor Interface (MIPI) Alliance to replace today's I²C and I²S interfaces while offering more features and requiring the same or less power than the two combined.

MCS 700 directly links distributed control components 702 in modules 310, 312, 320 and 340. Another distributed control component 704 may reside in master control system 640 of WCD 100. It is important to note that distributed control component 704 shown in processor 300 is not limited only to the disclosed embodiment, and may reside in any appropriate system module within WCD 100. The addition of MCS 700 provides a dedicated low-traffic communication structure for carrying delay sensitive information both to and from the various distributed control components 702.

Figure 8B:
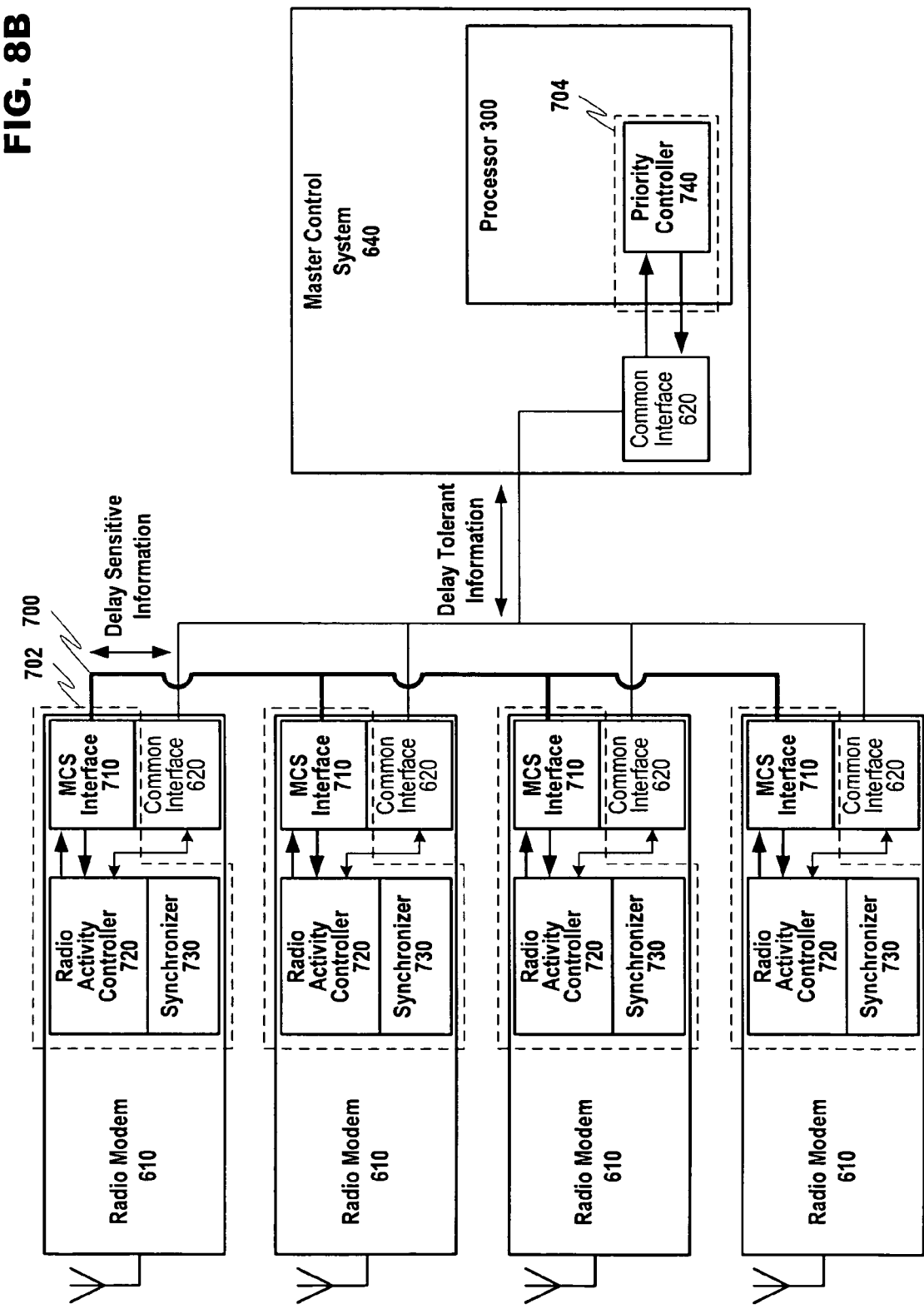
FIG. 8B discloses a more detailed structural representation of FIG. 8A including the distributed multiradio control system and the radio modems.

The example configuration disclosed in FIG. 8A is described further with respect to FIG. 8B. MCS 700 forms a direct link between distributed control components 702 within WCD 100. Distributed control components 702 in radio modems 610 (together forming a "module") may, for example, consist of MCS interface 710, radio activity controller 720 and synchronizer 730. Radio activity controller 720 uses MCS interface 710 to communicate with distributed control components in other radio modems 610. Synchronizer 730 may be utilized to obtain timing information from radio modem 610 to satisfy synchronization requests from any of the distributed control components 702. Radio activity controller 702 may also obtain information from master control system 640 (e.g., from distributed control component 704) through common interface 620. As a result, any information communicated by master control system 640 to radio activity controller 720 through common interface 620 may be deemed delay tolerant, and therefore, the actual arrival time of this information does not substantially influence communication system performance. On the other hand, all delay sensitive information may be conveyed by MCS 700, and therefore is insulated from master control system overloading.

As previously stated, distributed control component 704 may exist within master control system 640. Some aspects of this component may reside in processor 300 as, for example, a running software routine that monitors and coordinates the behavior of radio activity controllers 720. Processor 300 is shown to contain priority controller 740. Priority controller 740 may be utilized to monitor active radio modems 610 in order to determine priority amongst these devices. Priority may be determined by rules and/or conditions stored in priority controller 740. Modems that become active may request priority information from priority controller 740. Further, modems that go inactive may notify priority controller 740 so that the relative priority of the remaining active radio modems 610 may be adjusted accordingly. Priority information is usually not considered delay sensitive because it is mainly updated when radio modems 610 activate/deactivate, and therefore, does not frequently change during the course of an active communication connection in radio modems 610. In various embodiments of the present invention, this information may be conveyed to radio modems 610 using common interface system 620.

At least one impact of a distributed control MCS 700 is seen in FIG. 8C. System level 420 may continue to provide delay tolerant information to distributed control components 702 through master control system 640. In addition, distributed control components 702 in service level 430, such as modem activity controllers 720, may exchange delay sensitive information with each other via MCS 700. Each distributed control component 702 may distinguish between these two classes of information and act accordingly. Delay tolerant information may include information that typically does not change when a radio modem is actively engaged in communication, such as radio mode information (e.g., GPRS, Bluetooth™, WLAN, etc.), priority information that may be defined by user settings, the specific service the radio is driving (QoS, real time/non real time), etc. Since delay tolerant information changes infrequently, it may be delivered in due course by master control system 640 of WCD 100. Alternatively, delay sensitive (or time sensitive) information may include at least modem operational information that frequently changes during the course of a wireless connection, and therefore, requires immediate update. Delay sensitive information needs to be delivered directly between distributed control components 702, and may include radio modem synchronization and activity control information. Delay sensitive information may be provided in response to a request, or may be delivered as a result of a change in radio modem, which will be discussed with respect to synchronization below.

MCS interface 710 may be used to (1) Exchange synchronization information, and (2) Transmit identification or prioritization information between various radio activity controllers 720. In addition, as previously stated, MCS interface 710 may be utilized for communicating the radio parameters that are delay sensitive from a controlling point of view. MCS interface 710 can be shared between different radio modems (multipoint) but it cannot be shared with any other functionality that could limit the usage of MCS interface 710 from a latency point of view.

The control signals sent on MCS 700 that may enable/disable a radio modem 610 should be based upon a modem's periodic events. Each radio activity controller 720 may obtain this information about a radio modem's periodic events from synchronizer 730. This kind of event can be, for example, frame clock event in GSM (4.615 ms), slot clock event in Bluetooth™ (625 us) or targeted beacon transmission time in WLAN (100 ms) or any multiple of these. A radio modem 610 may send its synchronization indications when (1) Any radio activity controller 720 requests it, (2) a radio modem internal time reference is changed (e.g. due to handover or handoff). The latency requirement for the synchronization signal is not critical as long as the delay is constant within a few microseconds. The fixed delays can be taken into account in the scheduling logic of radio activity controller 710.

For predictive wireless communication mediums, the radio modem activity control may be based on the knowledge of when the active radio modems 610 are about to transmit (or receive) in the specific connection mode in which the radios are currently operating. The connection mode of each radio modem 610 may be mapped to the time domain operation in their respective radio activity controller 720. As an example, for a GSM speech connection, priority controller 740 may have knowledge about all traffic patterns of GSM. This information may be transferred to the appropriate radio activity controller 720 when radio modem 610 becomes active, which may then recognize that the speech connection in GSM includes one transmission slot of length 577 μs, followed by an empty slot after which is the reception slot of 577 μs, two empty slots, monitoring (RX on), two empty slots, and then it repeats. Dual transfer mode means two transmission slots, empty slot, reception slot, empty slot, monitoring and two empty slots. When all traffic patterns that are known a priori by the radio activity controller 720, it only needs to know when the transmission slot occurs in time to gain knowledge of when the GSM radio modem is active. This information may be obtained by synchronizer 730. When the active radio modem 610 is about to transmit (or receive) it must check every time whether the modem activity control signal from its respective radio activity controller 720 permits the communication. Radio activity controller 720 is always either allowing or disabling the transmission of one full radio transmission block (e.g. GSM slot).

VII. An Example of an Alternative Distributed Multiradio Control System.

Figure 9A:
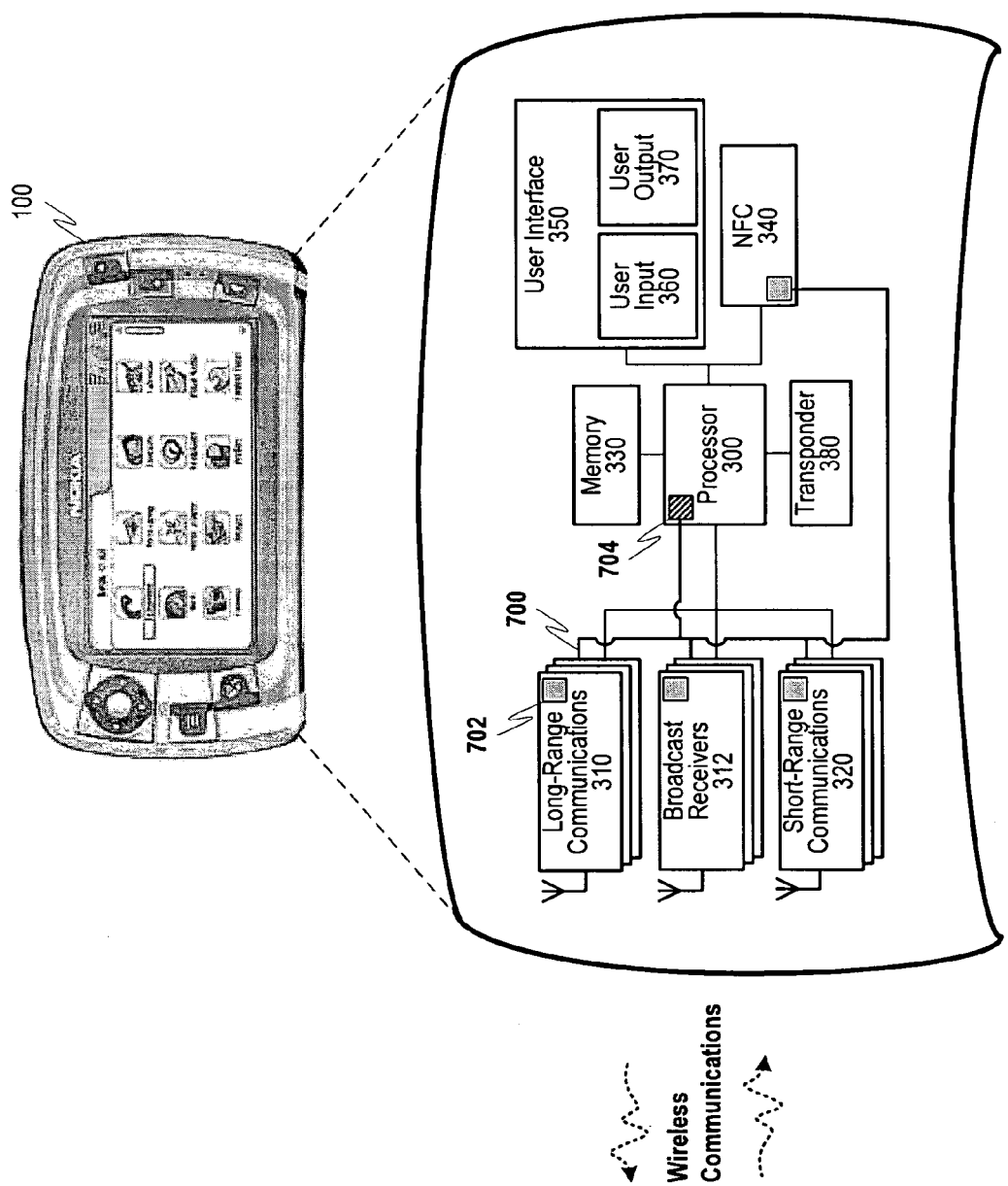
FIG. 9A discloses a structural example of a wireless communication device including a distributed multiradio control system in accordance with an alternative embodiment of the present invention.
Figure 9B:
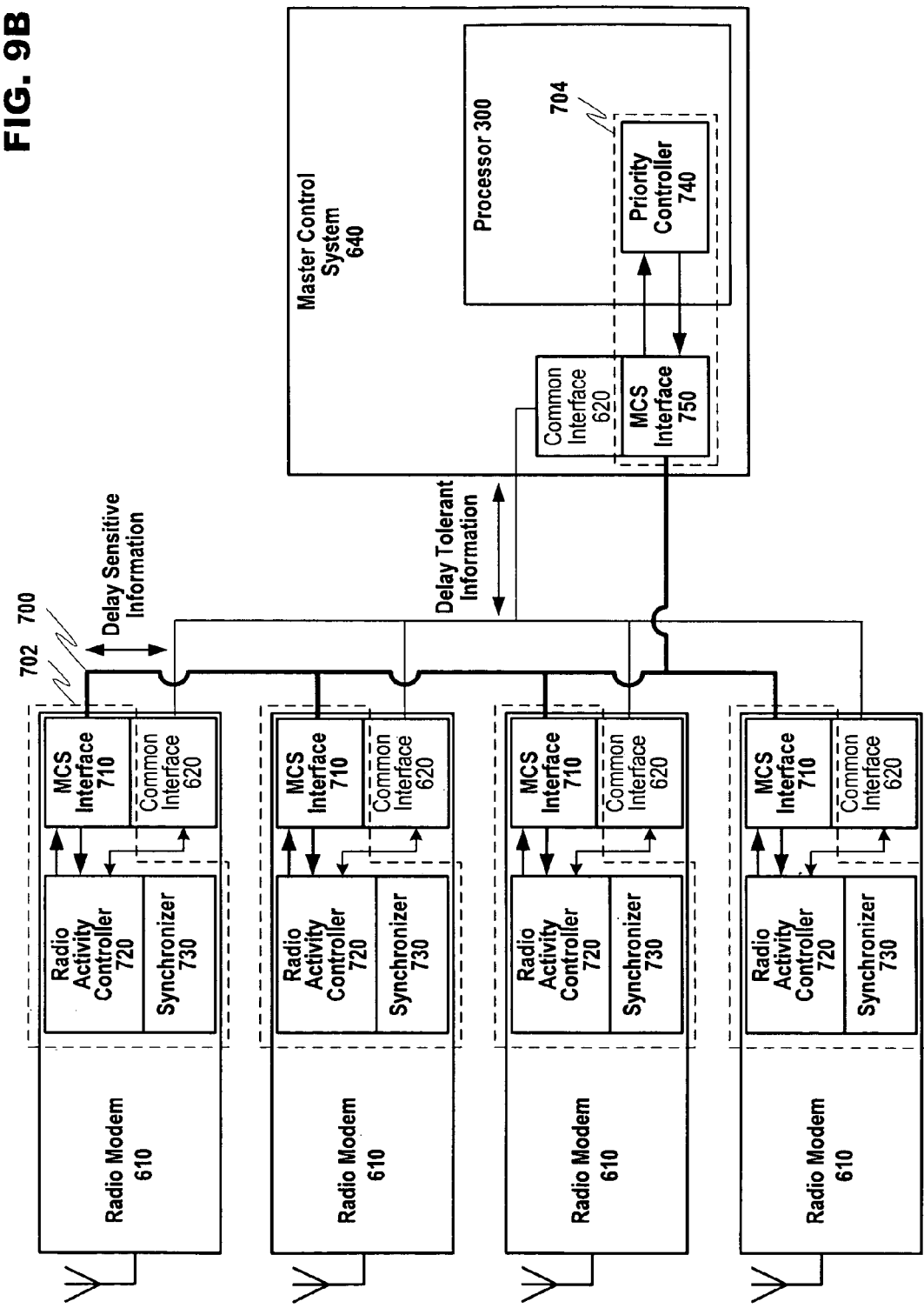
FIG. 9B discloses a more detailed structural representation of FIG. 9A including the distributed multiradio control system and the radio modems.

An alternative distributed control configuration, in accordance with at least one embodiment of the present invention, is disclosed in FIG. 9A-9C. In FIG. 9A, distributed control components 702 continue to be linked by MCS 700. However, now distributed control component 704 may also be directly coupled to distributed control components 702 via an MCS interface. As a result, distributed control component 704 may also utilize and benefit from MCS 700 for transactions involving the various communication components of WCD 100.

Referring now to FIG. 9B, the inclusion of distributed control component 704 onto MCS 700 is shown in more detail. Distributed control component 704 includes at least priority controller 740 coupled to MCS interface 750. MCS interface 750 may allow priority controller 740 to send information to, and receive information from, radio activity controllers 720 via a low-traffic connection dedicated to the coordination of communication resources in WCD 100. As previously stated, the information provided by priority controller 740 may not be deemed delay sensitive information, however, the provision of priority information to radio activity controllers 720 via MCS 700 may improve the overall communication efficiency of WCD 100. Performance may improve because quicker communication between distributed control components 702 and 704 may result in faster relative priority resolution in radio activity controllers 720. Further, common interface system 620 of WCD 100 may be relieved of having to accommodate communication traffic from distributed control component 704, reducing the overall communication load in master control system 640. Another benefit may be realized in communication control flexibility in WCD 100. New features may be introduced into priority controller 740 without worrying about whether the messaging between control components will be delay tolerant or sensitive because an MCS interface 710 is already available at this location.

FIG. 9C discloses possible operational effects on communication in WCD 100 in view of the enhancements implemented in the current alternative embodiment of the present invention. The addition of an alternative route for radio modem control information to flow between distributed control components 702 and 704 may both improve the communication management of radio activity controllers 720 and lessen the burden on master control system 640. In this embodiment, all distributed control components of MCS 700 are linked by a dedicated control interface, which provides immunity to communication coordination control messaging in WCD 100 when the master control system 640 is experiencing elevated transactional demands.

Figure 10:
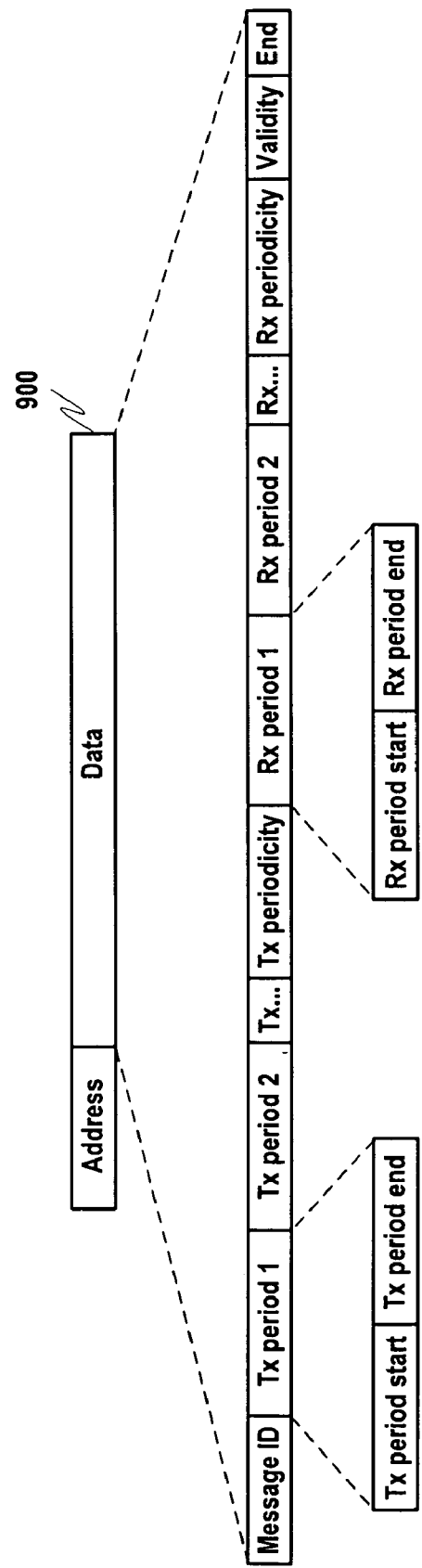
FIG. 10 discloses an example of an information packet usable with at least one embodiment of the present invention.

An example message packet 900, in accordance with various embodiments of the present invention, is disclosed in FIG. 10. Message packet 900 may include, for example, activity pattern information that may be formulated by MRC 600 or radio activity controller 720. An example data payload of packet 900 may include at least Message ID information, allowed/disallowed transmission (Tx) period information, allowed/disallowed reception (Rx) period information, Tx Rx periodicity (how often the Tx Rx activities contained in the period information occur), and validity information describing when the activity pattern becomes valid and whether the new activity pattern is replacing or added to the existing one. The data payload of packet 900, as shown, may consist of multiple allowed/disallowed periods for transmission or reception (e.g., Tx period 1, 2 . . . ) each containing at least a period start time and a period end time during which radio modem 610 may either be permitted or prevented from executing a communication activity. While the distributed example of MCS 700 may allow radio modem control activity to be controlled real-time (e.g., more control messages with finer granularity), the ability to include multiple allowed/disallowed periods into a single message packet 900 may support radio activity controllers 720 in scheduling radio modem behavior for longer periods of time, which may result in a reduction in message traffic. Further, changes in radio modem 610 activity patterns may be amended using the validity information in each message packet 900.

The modem activity control signal (e.g., packet 900) may be formulated by MRC 600 or radio activity controller 720 and transmitted on MCS 700. The signal includes activity periods for Tx and Rx separately, and the periodicity of the activity for the radio modem 610. While the native radio modem clock is the controlling time domain (never overwritten), the time reference utilized in synchronizing the activity periods to current radio modem operation may be based on one of at least two standards. In a first example, a transmission period may start after a pre-defined amount of synchronization events have occurred in radio modem 610. Alternatively, all timing for MRC 600 or between distributed control components 702 may be standardized around the system clock for WCD 100. Advantages and disadvantages exist for both solutions. Using a defined number of modem synchronization events is beneficial because then all timing is closely aligned with the radio modem clock. However, this strategy may be more complicated to implement than basing timing on the system clock. On the other hand, while timing based on the system clock may be easier to implement as a standard, conversion to modem clock timing must necessarily be implemented whenever a new activity pattern is installed in radio modem 610.

The activity period may be indicated as start and stop times. If there is only one active connection, or if there is no need to schedule the active connections, the modem activity control signal may be set always on allowing the radio modems to operate without restriction. The radio modem 610 should check whether the transmission or reception is allowed before attempting actual communication. The activity end time can be used to check the synchronization. Once the radio modem 610 has ended the transaction (slot/packet/burst), it can check whether the activity signal is still set (it should be due to margins). If this is not the case, the radio modem 610 can initiate a new synchronization with MRC 600 or with radio activity controller 720 through synchronizer 730. The same thing may happen if a radio modem time reference or connection mode changes. A problem may occur if radio activity controller 720 runs out of the modem synchronization and starts to apply modem transmission/reception restrictions at the wrong time. Due to this, modem synchronization signals need to be updated periodically. The more active wireless connections, the more accuracy is required in synchronization information.

VIII. Radio Modem Interface to Other Devices.

As a part of information acquisition services, MCS interface 710 may need to send information to MRC 600 (or radio activity controllers 720) about periodic events of the radio modems 610. Using its MCS interface 710, the radio modem 610 may indicate a time instance of a periodic event related to its operation. In practice these instances may include times when radio modem 610 is active and may be preparing to communicate or communicating. Events occurring prior to or during a transmission or reception mode may be used as a time reference (e.g., in case of GSM, the frame edge may be indicated in a modem that is not necessarily transmitting or receiving at that moment, but we know based on the frame clock that the modem is going to transmit [x]ms after the frame clock edge). Basic principle for such timing indications is that the event is periodic in nature. Every incident needs not to be indicated, but the MRC 600 may calculate intermediate incidents itself. In order for that to be possible, the controller may also require other relevant information about the event, e.g. periodicity and duration. This information may be either embedded in the indication or the controller may get it by other means. Most importantly, timing indications need to be such that the controller can acquire a radio modem's basic periodicity and timing. The timing of an event may either be in the indication itself, or it may be implicitly defined from the indication information by MRC 600 (or radio activity controller 720).

In general terms these timing indications need to be provided on periodic events like: schedule broadcasts from a base station (typically TDMA/MAC frame boundaries) and own periodic transmission or reception periods (typically Tx/Rx slots). Those notifications need to be issued by the radio modem 610: (1) on network entry (i.e. modem acquires network synchrony), (2) on periodic event timing change e.g. due to a handoff or handover and (3) as per the policy and configuration settings in the multiradio controller (monolithic or distributed).

In at least one embodiment of the present invention, various messages that are exchanged between the aforementioned communication components in WCD 100 may be used to dictate behavior on both a local (radio modem level) and global (WCD level) basis. MRC 600 or radio activity controller 720 may deliver a schedule to radio modem 610 with the intent of controlling that specific modem, however, radio modem 610 may not be compelled to conform to this schedule. The basic principle is that radio modem 610 is not only operating according to multiradio control information (e.g., operates only when MRC 600 allows) but is also performing internal scheduling and link adaptation while taking MRC scheduling information into account.

IX. Example Software-Defined Radio (SDR) Module.

The various examples of multiradio control implementation disclosed herein have been explained utilizing only hardware-based radio modules. A hardware-based radio module may be, for example, a radio module that relies primarily upon hardware components and static software elements (e.g., hard-coding or rewritable code that does not change during operation) for establishing communication. However, in accordance with at least one embodiment of the present invention, one or more transports may be supported in an apparatus by radio modules that rely more heavily upon a reconfigurable software-based element. The software-based element may be reconfigured at runtime, and therefore, these radio modules may be reconfigured to emulate various functionality that was traditionally only available through discrete modules.

In general, software-based elements may be implemented using known software tools (e.g., languages, compiled code, etc.) to establish instruction sets (e.g., programs, modules, etc.) that are executable by a processor. The functionality of a hardware-based component, or one or more elements of a hardware-based component, may be "defined" in terms of a set of instructions or conditions that exist within a program or module. Programs may be stored, for example, in a static or dynamic memory within an apparatus. When executed by a processor, these programs may access, manipulate, configure, etc. hardware elements in the apparatus in order to create the desired functionality. Examples of memory may include fixed or removable computer-readable media in a variety of formats (e.g., magnetic, optical, electronic, etc.).

Figure 11:
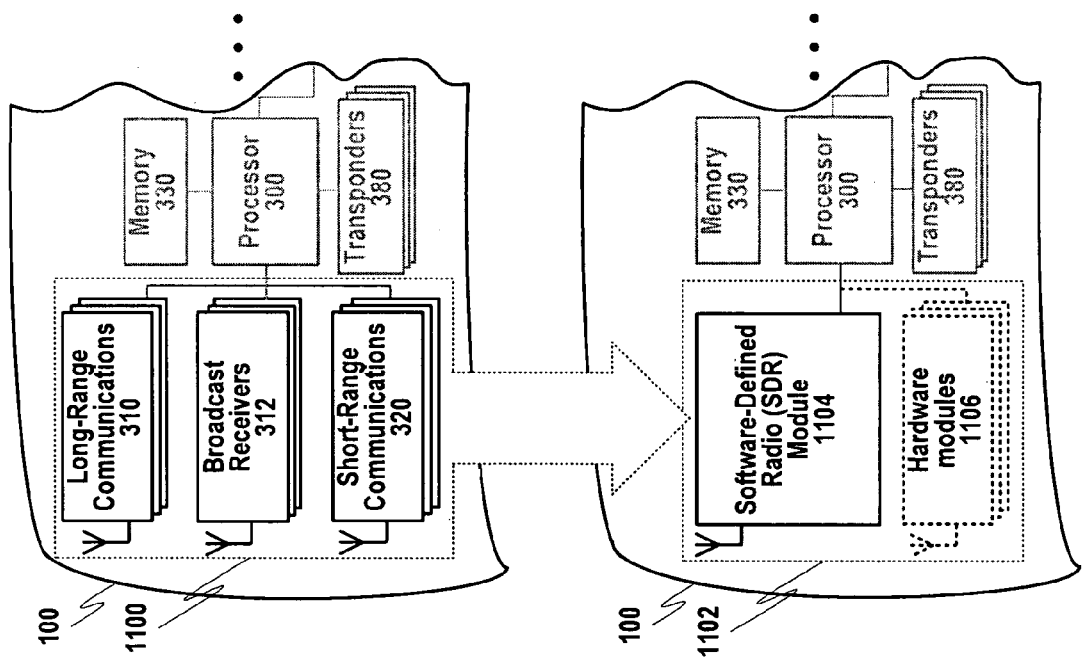
FIG. 11 discloses an example of a software-defined radio module usable in implementing various embodiments of the present invention.

An example implementation of a software-defined radio (SDR) module usable in accordance with various embodiments of the present invention is disclosed in FIG. 11. Initially, a partial representation of an example WCD 100, such, for example, as previously described herein with respect to various multiradio implementation examples, is shown at 1100. In this example, WCD 100 may employ distinct hardware-based communication modules corresponding to, for example, long-range communications 310, broadcast receivers 312 and short-range communications 320. However, the configuration of multiradio systems is not specifically limited to the structure shown at 1100.

For example, an alternative communication configuration for WCD 100 is shown at 1102. In this example, the apparatus may incorporate at least one SDR module 1104 in lieu of one or more discrete hardware-based radio modules. While the flexibility of SDR module 1104 may provide an option of omitting some communication hardware from WCD 100, this does not preclude the incorporation of one or more hardware-based modules 1106. Implementations incorporating both SDR radio modules 1104 and hardware-based modules 1106 (represented as optional in FIG. 11 through the use of dotted lines) are possible. Combined hardware-based and software-based technology implementations may be employed, for example, in situations where specialized hardware is required to support particular transports, it is more economical to implement a hardware-based solution for a particular transport, an SDR module 1102 and a hardware-based module 1106 are used to support transports that often operate concurrently (e.g., transports that do not interfere with each other, and therefore, can operate at the same time), etc.

Figure 12:
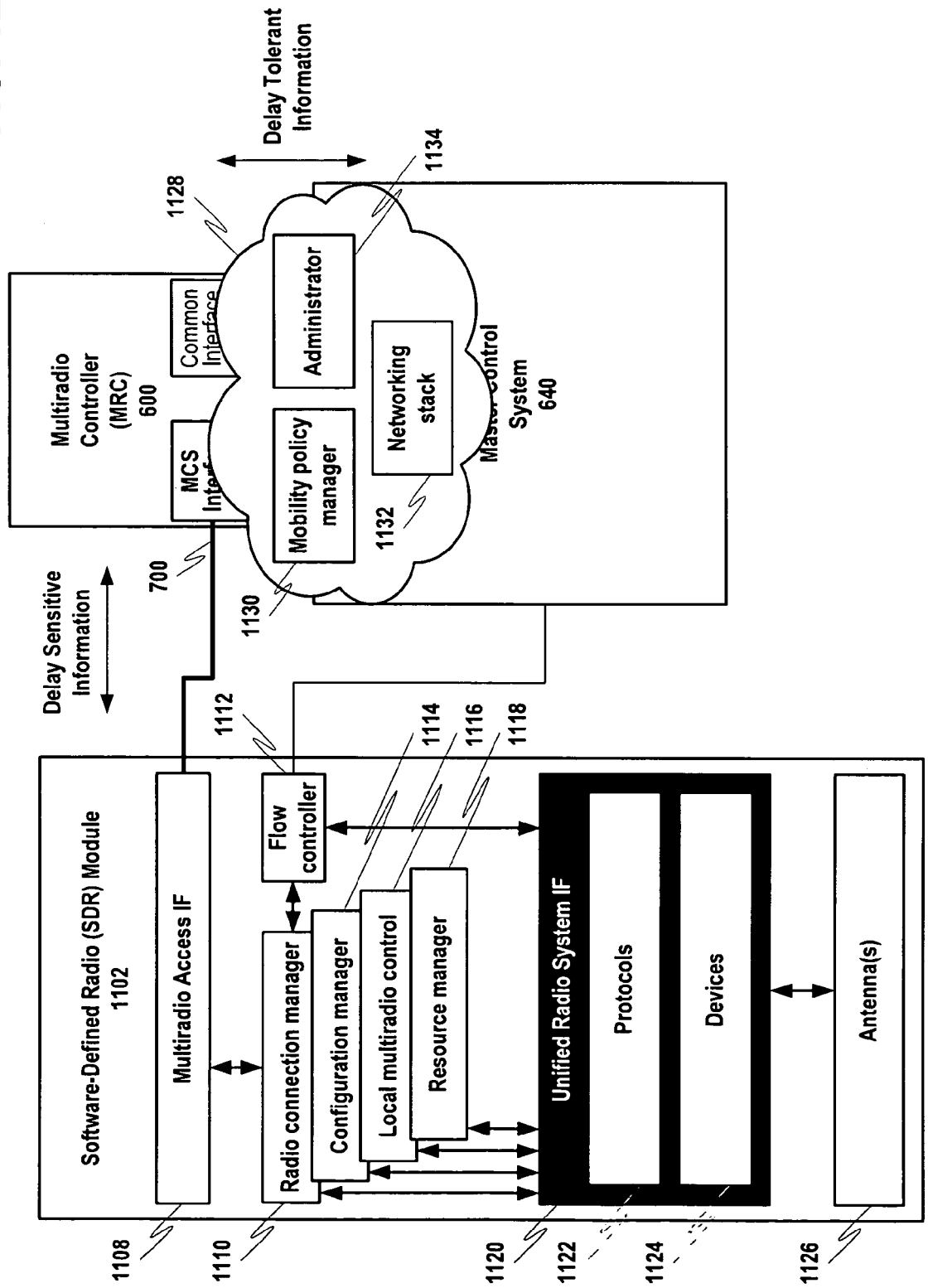
FIG. 12 discloses an example modular representation of the software-defined radio module disclosed in FIG. 11.

Now referring to FIG. 12, a more detailed example of a SDR module is disclosed in accordance with at least one embodiment of the present invention. "Radio computers," which fall within the broader software-defined radio (SDR) concept, include platform architectures in which the different radio systems are loaded as software (e.g., as radio programs) and in which as single HW/SW platform can be used to implement different wireless connectivity features on shared processing resources. The radio programs may serve the purpose of cellular communication, local connectivity, broadcast, navigation, etc., and they can be integrated into legacy (existing) radio systems or form totally new radios. Further, "cognitive" radios include the ability to sense the surrounding environment and to share this information with peers. The sensed information may be utilized, for example, in distributed sensing strategies that allow apparatuses to make localized decisions in view of the entire environment when configuring communication.

FIG. 12 explains an example of a possible implementation of a SDR 1102 utilizing a previously disclosed embodiment of the present invention. SDR 1102 may interact with multi-radio control features (e.g., MRC 600) via MCS 700 and/or via common interfaces that may be components of master control system 640. For example, SDR 1102 may include a multiradio access interface 1108 configured for the transmission and reception of delay-sensitive information via MCS 700. In addition, flow controller 1112 in SDR 1102 may interact with programs in master control system 640 in order to regulate the flow of messages being sent from, and being received into, SDR 1102. Multiradio access interface 1108 and flow controller 1112 may interact with various software components within SDR 1102 to emulate various hardware-based radio modules.

For example, information received via the aforementioned interfaces may be used to determine how SDR 1102 is to be configured. As part of this configuration, radio connection manager 1110 may receive data from multiradio access interface 1108 and/or flow controller 1112. This data may include at least one of instruction information (e.g., rules or preferences regarding which transports to utilize in certain situations) and messages awaiting transmission. Radio connection manager 1110 may then interact with some or all of configuration manager 1114, local multiradio control 1116 and resource manager 1118 in order to configure SDR 1102. For instance, configuration manager 1114 may provide information regarding resources required for supporting a particular wireless transport, and resource manager 1118 may determine if these resources are available. If radio connection manager 1110 decides that it is possible to configure SDR 1102 to support the particular wireless transport (e.g., in view of the information provided by the other modules) then local multiradio control 1116 may implement the configuration. While an example of a usable configuration for SDR 1102 has been disclosed in FIG. 12, other configurations are also possible in accordance with various embodiments of the present invention. For example, in an alternate configuration the functionality of MRC 600 and local multiradio controller 1116 may be implemented as a single functional element in WCD 100.

In implementing a particular radio configuration, some or all of software modules 1110-1118 may interact with unified radio system interface 1120 in order to establish settings that will allow SDR 1102 to emulate a desired radio functionality. For example, unified radio systems may include both protocol information 1122 and device information 1124 that may be usable when replicating the functionality of hardware-based radios. The configured software resources may then access hardware resources (e.g., antennas 1126) to send and/or receive wireless messages. For example, information in protocols 1122 and devices 1124 may be accessed and/or manipulated in order to emulate the functionality of a radio module that is configured to operate using a first transport (e.g., Bluetooth™ (BT)), and at the conclusion of activity may be reconfigured to support other communication in WCD 100 (e.g., WLAN).

In addition, it may be possible for SDR module 1108 to have cognitive features. Characteristics like apparatus status (e.g., process load, pending messages, power condition, etc.) and the environment proximate to an apparatus may be utilized to configure SDR module 1102. For example, resources in SDR module 1102, another radio module, or elsewhere in WCD 100 may be able to identify signals that could potentially interfere with apparatus communication. The identification of signal interference may be provided from sensor information (e.g., a sensor may detect a signal in proximity to an apparatus) and/or may be identified through information that is already "known" to WCD 100. For example, MRC 600 may schedule communication in a multiradio system, and therefore, some or all of the schedule information may be provided to, or accessed by, SDR module 1102. Regardless of the source, information on potential interference signals may be utilized when determining the optimum configuration for SDR module 1102.

In accordance with various embodiments of the present invention, SDR module 1102 may interact with various program modules 1128 residing in at least one of MRC 600 or master control system 640. Program modules 1128 may provide apparatus side coordination of communication when, for example, multiple SDR modules 1102 are active, or when SDR module 1102 is active at the same time as a hardware-based radio module. Example program modules that may exist within program modules 1128 include, but are not limited to, mobility policy manager 1130, networking stack 1120 and administrator 1134. In at least one scenario, mobility policy manager 1130 may define preferences and/or rules that control utilization of transports in an apparatus (e.g., WCD 100). These preferences and/or rules may be based on various apparatus, application or user-defined characteristics. For example, the number of messages pending for each transport in networking stack 1132 may determine the next transport that will be implemented (e.g., a priority between the active transports), and therefore, the next configuration for SDR module 1102. In making this determination, mobility policy manager 1130 may work with administrator 1134 to create an appropriate implementation schedule so that communication may continue within the guidelines set forth in the preferences and/or rules.

X. Example Configuration Methodology for SDR Modules

As generally set forth above, an apparatus may utilize a variety of characteristic information when determining how to configure a SDR module 1102. However, characteristic information pertaining only to the apparatus itself may not address all issues that could potentially influence a transaction (e.g., including characteristics that may exist in one or more apparatuses with which communication is desired). In accordance with various embodiments of the present invention, conditions that exist in or around other apparatuses participating in wireless communication may, in some instances, alter the determination process with respect to configuring SDR module 1102.

Figure 13:
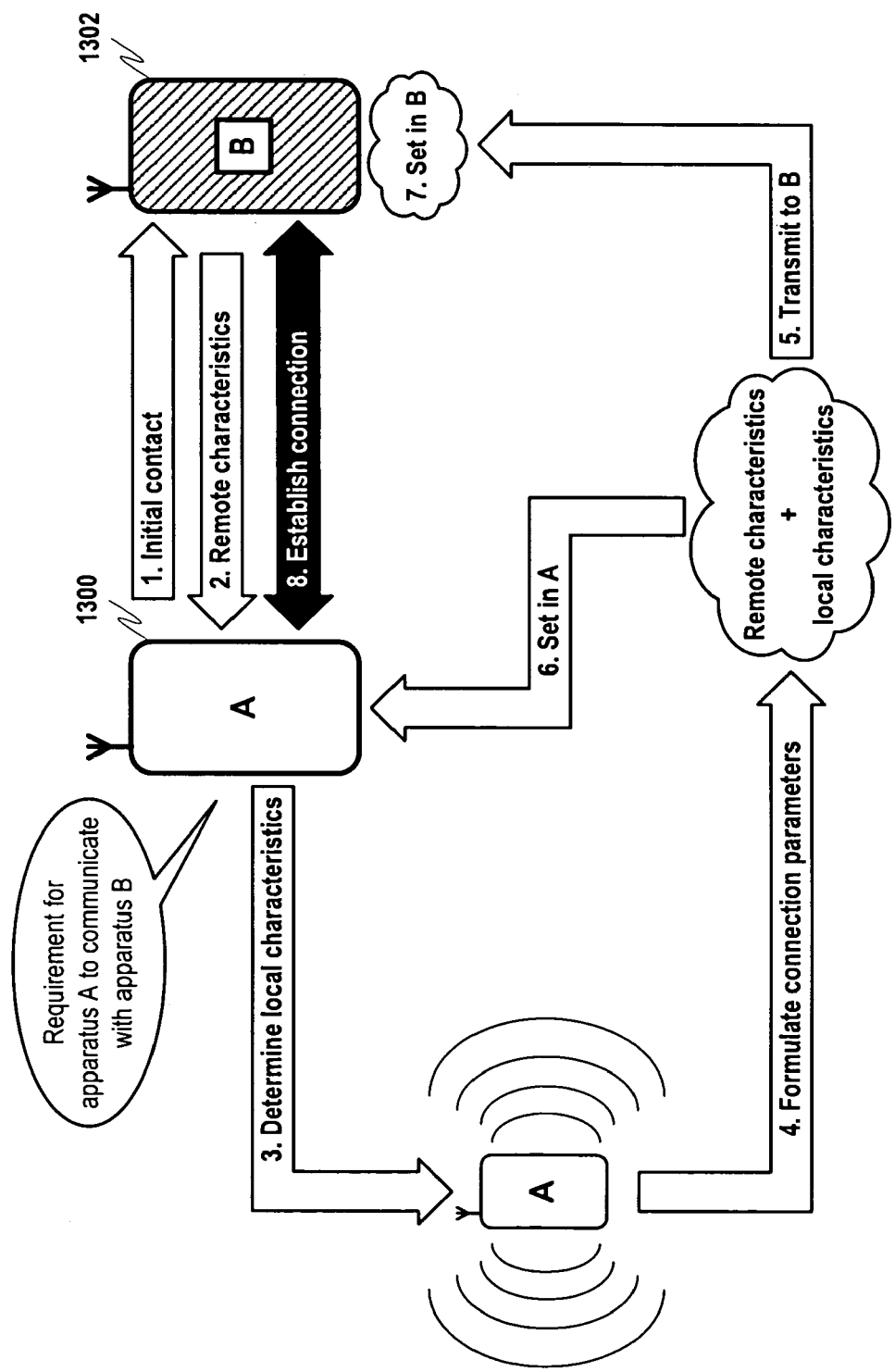
FIG. 13 discloses an operational example in accordance with at least one embodiment of the present invention.

FIG. 13 discloses an example including two apparatuses. While FIG. 13 discloses a scenario where a first apparatus desires to establish wireless communication (e.g., a wireless link) with a second apparatus, this example is presented herein only for the sake of explanation. As such, the present invention is not limited only to the disclosed interaction (e.g., may involve more than two apparatuses) or any particular wired or wireless transports. Further, while various implementations of the present invention have been described herein as integrated with a multiradio control system, various embodiments of the present invention may also operate in standalone situations (e.g., configurations where no multiradio control has been established).

In this non-limiting example, apparatus A 1300 has a requirement to interact with apparatus B 1302 in FIG. 13. Such a requirement to establish communication may be initiated by, for example, applications and/or utilities executing on apparatus A 1300, user interaction with apparatus A 1300, etc. In response to this requirement, apparatus A 1300 may send a wireless inquiry to apparatus B 1302. The wireless inquiry may be sent, for example, utilizing a channel (e.g., an initialization channel) that is known to (e.g., predefined or predetermined) each apparatus. Apparatus B 1302 may acknowledge receipt of the inquiry from apparatus A 1300, and may in turn respond with one or more messages accepting the invitation to communicate and containing remote characteristics. Remote characteristics comprise information related to the apparatus with which communication is desired (e.g., apparatus B 1302), and may include information regarding apparatus status and/or environmental conditions proximate to the apparatus. For instance, apparatus status information may include apparatus communication capabilities and/or preferences, current apparatus power condition, current apparatus operational condition, current communication activity including transports active in the apparatus and a number of messages pending for each active transport, etc. Information pertaining to environmental conditions may include signals sensed in proximity to the apparatus that may potentially cause interference, communication scheduled in the apparatus, the identification of other apparatuses operating in proximity, etc. Some or all of this information may be provided in response to the inquiry of apparatus A 1300.

Apparatus A 1300 may also determine characteristics pertaining to itself, which are designated local characteristics in FIG. 13. Local characteristics may include all of the information discussed above with respect to remote characteristics, but from the perspective of the initiating apparatus. While local characteristics are formulated after remote characteristics in the example of FIG. 13, the determination of local characteristics is not limited to this temporal organization. In particular, the determination of local characteristics may occur before, during or after the receipt of remote characteristics from apparatus B 1302. Once Apparatus A 1300 has both the remote and local characteristic information, a configuration for SDR module 1102 may be formulated. The configuration may define a transport, or a list of transports (e.g., in priority order), for use in communication with apparatus B 1302, channel selection for each transport (e.g., hopping patterns), error correction, Quality of Service (QoS) requirements, operational schemes (e.g., power saving, high speed, etc.), radio module priority (for conflict resolution), etc.

After formulation of the configuration is complete, the configuration may be sent to apparatus B 1302. In various embodiments of the present invention, the configuration may be sent to apparatus B 1302 on the initialization channel. Apparatus A 1300 and apparatus B 1302 may then set the configuration. Setting a configuration may include, for example, programming one or more SDR modules 1102 in each apparatus for establishing communication in accordance with the configuration. After the configuration is set in apparatus A 1300 and apparatus B 1302, either apparatus may initiate communication (e.g., establish a wireless link between apparatuses).

It is important to note that, in various embodiments of the present invention, the communication may continue in accordance with the existing configuration until an event occurs that would necessitate a new configuration. Examples of events that may necessitate a new configuration may include, but are not limited to, fulfillment of the communication requirement, a loss of wireless connection between the apparatuses, sensed interference in proximity to either apparatus, a higher priority communication in one or both of the apparatuses that could conflict with current communication, a status change in either apparatus (e.g., power depletion), etc.

Figure 14A:
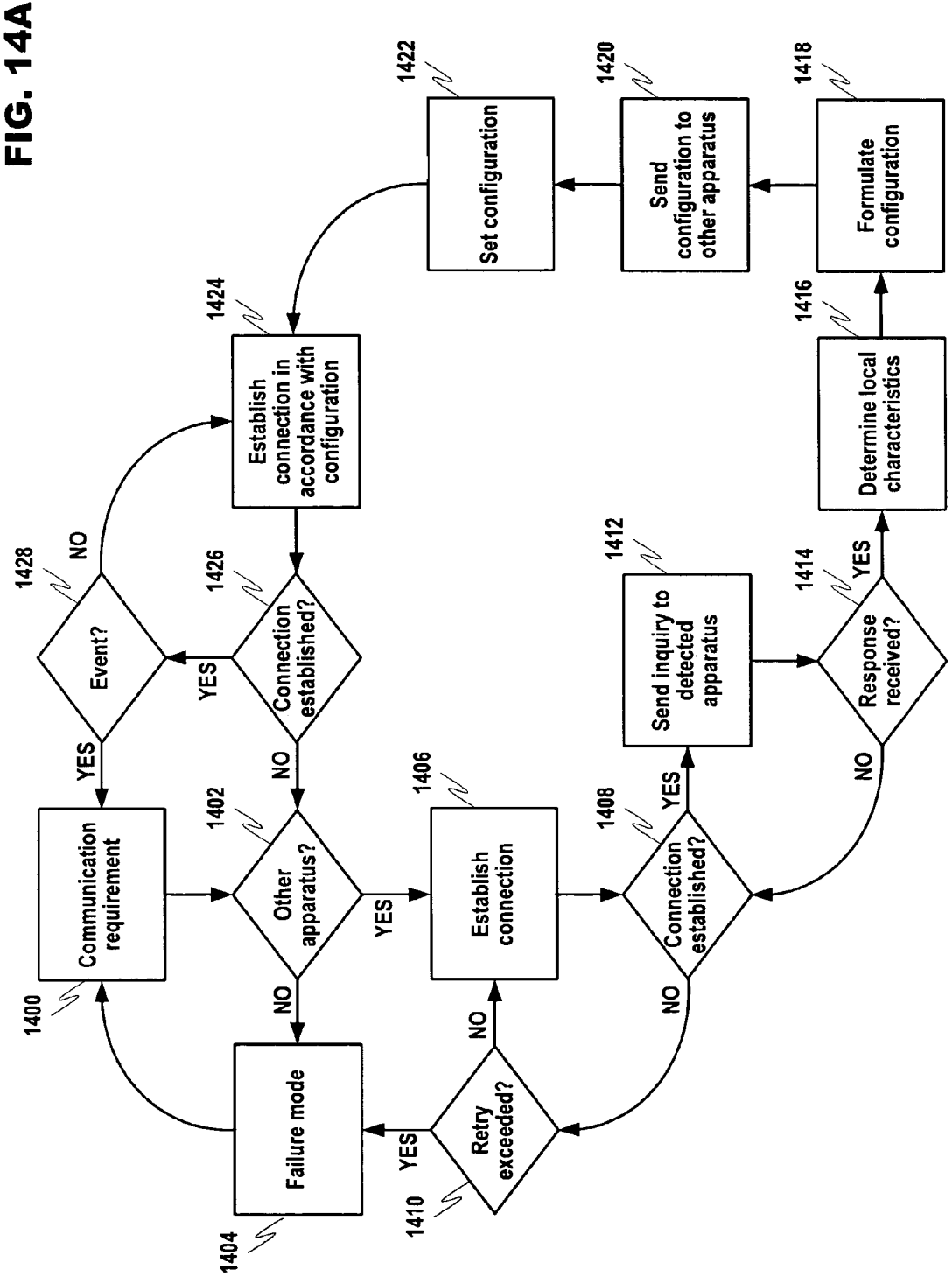
FIG. 14A discloses a flowchart for an example configuration process from the initiator side in accordance with at least one embodiment of the present invention.

A flowchart of an example configuration process in accordance with at least one embodiment of the present invention is disclosed in FIG. 14A. The process may begin in step 1400 with the realization of a communication requirement in an apparatus. A determination may then be made in step 1402 as to whether any other apparatuses that can fulfill the requirement are within communication range of the apparatus. If no other apparatuses are discovered, then in step 1404 the process may enter a failure mode, wherein the failure mode may include one or more activities executed when the requirement cannot be fulfilled. Activities may include, for example, a visible, audible or tactile notification of communication failure to an apparatus user. The process may then return to step 1400 to await subsequent requirements for communication.

If at least one other apparatus that can fulfill the communication requirement is detected within range of the apparatus, then in step 1406 a connection request may be sent to the other apparatus. Connection requests may be sent on a channel known to both apparatuses (e.g., an initialization channel). If no response is received from the other apparatus in step 1408, then in step 1410 a determination may be made as to whether a retry condition has been exceeded. Examples of retry conditions include a duration of time since the original connection attempt, a number of retries, etc. Connection requests may continue in step 1406 until the retry condition is exceeded (step 1410), at which point the failure mode described in step 1404 may be triggered.

If the other apparatus acknowledges the connection request, then in step 1412 an inquiry may be sent to the other apparatus. The inquiry may request, or trigger the provision of, remote characteristic information from the other apparatus. If remote characteristic information is not received in step 1414, then a determination may be made in step 1408 as to whether the wireless connection was lost. If a response is received in step 1414 (e.g., including remote characteristics pertaining to the other apparatus), then in step 1416 local characteristics related to the initiating apparatus may be determined. As stated above, steps 1414 and 1416 do not have to occur in the order depicted in FIG. 14A, as the determination of local characteristics may occur in the initiating apparatus before, during or after the receipt of the remote characteristics.

The initiating apparatus may then formulate a configuration based on at least the remote characteristic information and the local characteristic information in step 1418. The completed configuration may, for example, allow an apparatus to program one or more SDR modules 1102 for wireless communication. The configuration may then be sent to the other apparatus in step 1420. In accordance with at least one embodiment of the present invention, the configuration may be sent from the initiating apparatus to the other apparatus on the initialization channel. For example, the configuration may be set in the initiating apparatus (step 1422) by ceasing interaction with the other apparatus on the initialization channel, and then programming one or more SDR modules 1102 to communicate in accordance with the configuration.

In step 1424 the connection defined by the configuration may be established. The connection may be, for example, a wireless link on a channel different than the initialization channel, or even via a totally different wireless transport. If a connection fails to be established, as determined in step 1426, then the process may return to step 1402 to determine if the other apparatus can still be detected. For example, the other apparatus originally discovered in step 1402 may have moved outside of the range of the wireless transport configured in step 1422 by the time a connection is attempted in step 1424. If the connection (e.g., wireless link) defined by the configuration is established in step 1426, the connection may continue in step 1428 until an event occurs that would necessitate the formulation of a new configuration. For example, completion of the current communication requirement, an interference signal sensed in proximity to one or both apparatuses, a higher priority communication in one of the apparatuses, etc. may be considered events that would cause the process to return to step 1400 in preparation for the formulation of a new configuration based on, for example, a new communication requirement.

Figure 14B:
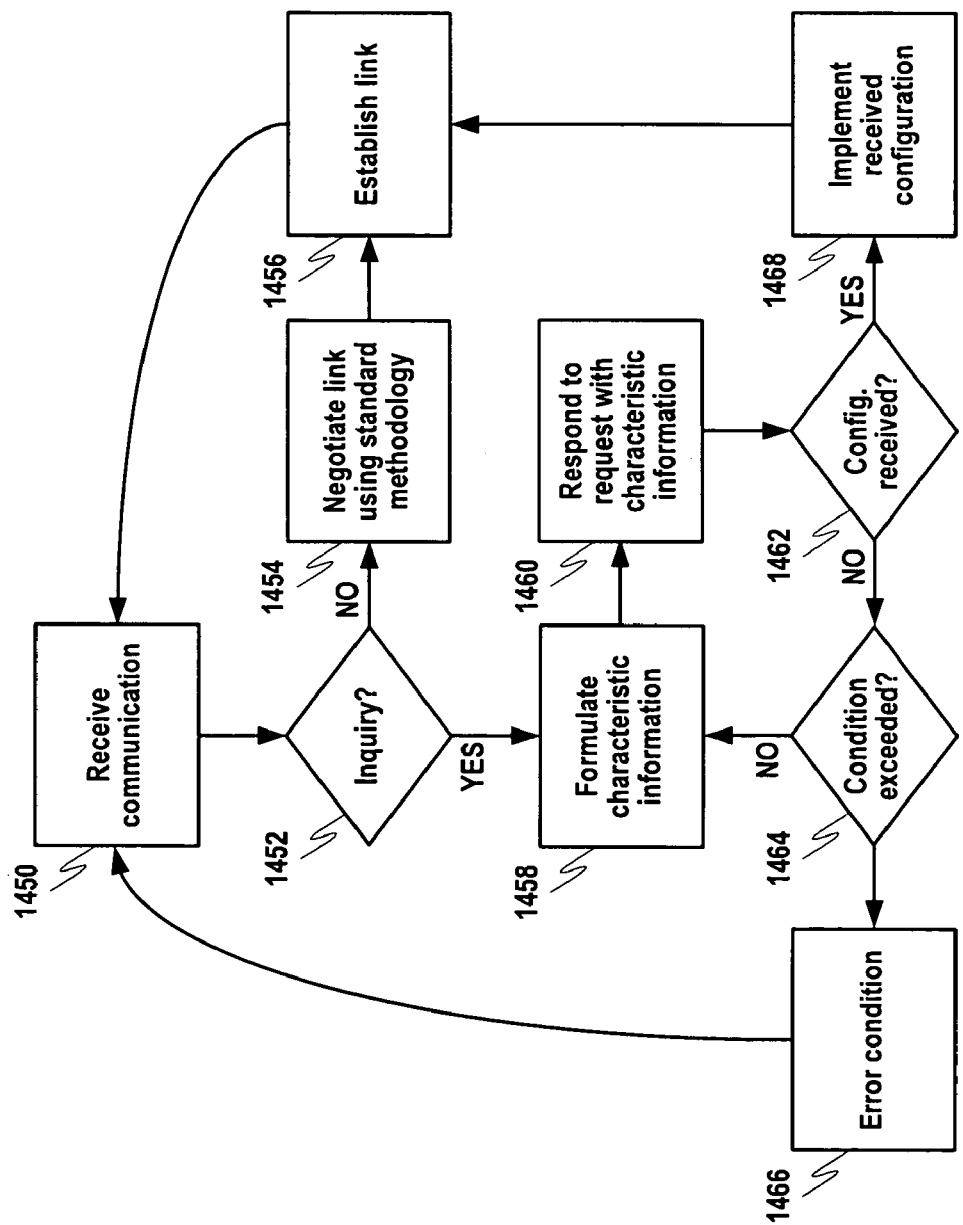
FIG. 14B discloses a flowchart for an example configuration process from the receiving side in accordance with at least one embodiment of the present invention.

A flowchart depicting an example process for establishing a wireless connection from the perspective of an apparatus that is receiving the initial inquiry, in accordance with at least one embodiment of the present invention, is now disclosed with respect to FIG. 14B. Initially, a wireless communication may be received by an apparatus (e.g., apparatus B 1302) in step 1450. A determination may then be made in step 1452 as to whether the communication comprises an inquiry requesting characteristic information from the receiving apparatus. If no characteristic information is requested, then in step 1454 a link may be negotiated in accordance with standard communication methodology (e.g., based on the protocol for the wireless transport that is currently being utilized), which may be followed by link establishment in step 1456.

If in step 1452 a determination is made that a characteristic information inquiry is present in the received communication, then the receiving apparatus may formulate characteristic information concerning itself (e.g., in accordance with the various examples presented herein). While characteristic information formulation is shown as step 1458 in the FIG. 14B process, the formulation of characteristic information is not strictly limited to this instance. The formulation of characteristic information may also occur before receiving the inquiry, periodically, etc. A response may then be sent to the inquiring apparatus in step 1460, the response comprising at least the characteristic information. The receiving device may then enter a waiting loop in steps 1462 and 1464. For example, the receiving apparatus may wait for a configuration from the initiating apparatus until a condition is exceeded (e.g., until a duration from the time that the characteristic information response was sent, until a number of retry transmissions has been exceeded, etc.). In the example of a retry limit condition, the receiving apparatus may attempt to resend the characteristic information response in order to ensure that this information was successfully received. If no configuration is received, and the condition is exceeded in step 1464, then in step 1466 an error condition may commence. Examples of activities that may be executed in an error condition may include, for example, displaying notification to a user that no configuration was received, reformulating and retransmitting the characteristic information to the initiating apparatus, verification of the presence of the initiating apparatus, etc. The process may then restart in step 1450 with the receiving apparatus awaiting further communication.

If in step 1462 a communication configuration is received from the initiating apparatus, then in step 1468 the received communication configuration may be implemented in the receiving apparatus. Implementation of the configuration in the receiving apparatus may include, for example, the configuration of a hardware-based radio module (or alternatively of a SDR module enabled to emulate hardware-based radio functionality) to communicate utilizing particular wireless transports, particular channels or certain features/modes (e.g., error checking, power saving, etc.). A link in accordance with the received communication configuration may then be established in step 1456. After the communication transaction is completed, the process may again reinitiate in step 1450, wherein the receiving apparatus awaits further communication.

Accordingly, it will be apparent to persons skilled in the relevant art that various changes in form a and detail can be made therein without departing from the spirit and scope of the invention. The breadth and scope of the present invention should not be limited by any of the above-described example embodiments, but should be defined only in accordance with the following claims and their equivalents.

What is claimed:

1. A method, comprising:
   initiating an inquiry from an apparatus to at least one other apparatus;
   receiving remote characteristic information into the apparatus, the remote characteristic information comprising at least one of supported communication transport configuration information for the at least one other apparatus, power status information for the at least one other apparatus, processing load information for the at least one other apparatus, communication load information for the at least one other apparatus, proximate interference information for the at least one other apparatus and user preferences configured in the at least one other apparatus;
   determining local characteristic information in the apparatus;
   formulating a configuration in the apparatus, the configuration being based on the remote characteristic information and the local characteristic information;
   sending the configuration from the apparatus to the at least one other apparatus;
   implementing the configuration in the apparatus; and
   establishing communication between the apparatus and at least one other apparatus in accordance with the configuration.

2. The method of claim 1, wherein the inquiry is conducted via an initialization channel that is established in both the apparatus and the at least one other apparatus.

3. The method of claim 1, wherein local characteristic information comprises at least one of supported communication transport configuration information for the apparatus, power status information for the apparatus, processing load information for the apparatus, communication load information for the apparatus, proximate interference information for the apparatus, and user preferences configured in the apparatus.

4. The method of claim 1, wherein the configuration comprises at least information that is required by the apparatus and the at least one other apparatus in order to establish communication via a wireless transport, the wireless transport being determined based on the remote characteristic information and the local characteristic information.

5. The method of claim 1, wherein the configuration is sent via an initialization channel that is established in both the apparatus and the at least one other apparatus, the at least one other apparatus implementing the configuration that was sent from the apparatus.

6. The method of claim 1, wherein implementing the configuration comprises discontinuing communication occurring on an initialization channel and resetting resources in the apparatus and the at least one other apparatus in accordance with the configuration.

7. The method of claim 1, wherein the communication between the apparatus and the at least one other apparatus is established via a wireless transport that is different from the wireless transport utilized to transmit the inquiry from the apparatus.

8. A computer program product comprising computer executable program code recorded on a computer readable medium, the computer executable program code comprising:
   computer program code configured to initiate an inquiry from an apparatus to at least one other apparatus;
   computer program code configured to receive remote characteristic information into the apparatus, the remote characteristic information comprising at least one of supported communication transport configuration information for the at least one other apparatus, power status information for the at least one other apparatus, processing load information for the at least one other apparatus, communication load information for the at least one other apparatus, proximate interference information for the at least one other apparatus and user preferences configured in the at least one other apparatus;
   computer program code configured to determine local characteristic information in the apparatus;
   computer program code configured to formulate a configuration in the apparatus, the configuration being based on the remote characteristic information and the local characteristic information;
   computer program code configured to send the configuration from the apparatus to the at least one other apparatus;
   computer program code configured to implement the configuration in the apparatus; and
   computer program code configured to establish communication between the apparatus and at least one other apparatus in accordance with the configuration.

9. The computer program product of claim 8, wherein the inquiry is conducted via an initialization channel that is established in both the apparatus and the at least one other apparatus.

10. The computer program product of claim 8, wherein local characteristic information comprises at least one of supported communication transport configuration information for the apparatus, power status information for the apparatus, processing load information for the apparatus, communication load information for the apparatus, proximate interference information for the apparatus, and user preferences configured in the apparatus.

11. The computer program product of claim 8, wherein the configuration comprises at least information that is required by the apparatus and the at least one other apparatus in order to establish communication via a wireless transport, the wireless transport being determined based on the remote characteristic information and the local characteristic information.

12. The computer program product of claim 8, wherein the configuration is sent via an initialization channel that is established in both the apparatus and the at least one other apparatus, the at least one other apparatus implementing the configuration that was sent from the apparatus.

13. The computer program product of claim 8, wherein implementing the configuration comprises discontinuing communication occurring on an initialization channel and resetting resources in the apparatus and the at least one other apparatus in accordance with the configuration.

14. The computer program product of claim 8, wherein the communication between the apparatus and the at least one other apparatus is established via a wireless transport that is different from the wireless transport utilized to transmit the inquiry from the apparatus.

15. An apparatus, comprising:
at least one software-defined radio module; and
a processor, the processor being configured to:
  initiate an inquiry from to at least one other apparatus;
  receive remote characteristic information, the remote characteristic information comprising at least one of supported communication transport configuration information for the at least one other apparatus, power status information for the at least one other apparatus, processing load information for the at least one other apparatus, communication load information for the at least one other apparatus, proximate interference information for the at least one other apparatus and user preferences configured in the at least one other apparatus;
  determine local characteristic information;
  formulate a configuration, the configuration being based on the remote characteristic information and the local characteristic information;
  send the configuration to the at least one other apparatus;
  implement the configuration; and
  establish communication with at least one other apparatus in accordance with the configuration.

16. The apparatus of claim 15, wherein the inquiry is conducted via an initialization channel that is established in both the apparatus and the at least one other apparatus.

17. The apparatus of claim 15, wherein local characteristic information comprises at least one of supported communication transport configuration information for the apparatus, power status information for the apparatus, processing load information for the apparatus, communication load information for the apparatus, proximate interference information for the apparatus, and user preferences configured in the apparatus.

18. The apparatus of claim 15, wherein the configuration comprises at least information that is required by the apparatus and the at least one other apparatus in order to establish communication via a wireless transport, the wireless transport being determined based on the remote characteristic information and the local characteristic information.

19. The apparatus of claim 15, wherein the configuration is sent via an initialization channel that is established in both the apparatus and the at least one other apparatus, the at least one other apparatus implementing the configuration that was sent from the apparatus.

20. The apparatus of claim 15, wherein implementing the configuration comprises discontinuing communication occurring on an initialization channel and resetting resources in the apparatus and the at least one other apparatus in accordance with the configuration.

21. The apparatus of claim 15, wherein the communication between the apparatus and the at least one other apparatus is established via a wireless transport that is different from the wireless transport utilized to transmit the inquiry from the apparatus.

22. An apparatus, comprising:
means for initiating an inquiry from the apparatus to at least one other apparatus;
means for receiving remote characteristic information into the apparatus, the remote characteristic information comprising at least one of supported communication transport configuration information for the at least one other apparatus, power status information for the at least one other apparatus, processing load information for the at least one other apparatus, communication load information for the at least one other apparatus, proximate interference information for the at least one other apparatus and user preferences configured in the at least one other apparatus;
means for determining local characteristic information in the apparatus;
means for formulating a configuration in the apparatus, the configuration being based on the remote characteristic information and the local characteristic information;
means for sending the configuration from the apparatus to the at least one other apparatus;
means for implementing the configuration in the apparatus; and
means for establishing communication between the apparatus and at least one other apparatus in accordance with the configuration.

23. A method, comprising:
receiving wireless communication in an apparatus;
if the wireless communication includes an inquiry requesting characteristic information, determining characteristic information comprising at least one of supported communication transport configuration information for the apparatus, power status information for the apparatus, processing load information for the apparatus, communication load information for the apparatus, proximate interference information for the apparatus and user preferences configured in the apparatus;
responding to the inquiry, the response comprising the characteristic information;
receiving further wireless communication in the apparatus, the further wireless communication including a configuration;
implementing the configuration in the apparatus; and
establishing communication in accordance with the configuration.

24. A computer program product comprising computer executable program code recorded on a computer readable medium, the computer executable program code comprising:
computer program code configured to receive wireless communication in an apparatus;
computer program code configured to, if the wireless communication includes an inquiry requesting characteristic information, determine characteristic information comprising at least one of supported communication transport configuration information for the apparatus, power status information for the apparatus, processing load information for the apparatus, communication load information for the apparatus, proximate interference information for the apparatus and user preferences configured in the apparatus;
computer program code configured to respond to the inquiry, the response comprising the characteristic information;
computer program code configured to receive further wireless communication in the apparatus, the further wireless communication including a configuration;
computer program code configured to implement the configuration in the apparatus; and
computer program code configured to establish communication in accordance with the configuration.

25. An apparatus, comprising:
at least one radio module; and
a processor, the processor being configured to:
  receive wireless communication in an apparatus;
  if the wireless communication includes an inquiry requesting characteristic information, determine characteristic information comprising at least one of supported communication transport configuration information for the apparatus, power status information for the apparatus, processing load information for the apparatus, communication load information for the apparatus, proximate interference information for the apparatus and user preferences configured in the apparatus;

respond to the inquiry, the response comprising the characteristic information;

receive further wireless communication in the apparatus, the further wireless communication including a configuration;

implement the configuration in the apparatus; and establish communication in accordance with the configuration.

26. An apparatus, comprising:

means for receiving wireless communication in an apparatus;

means for, if the wireless communication includes an inquiry requesting characteristic information, determining characteristic information comprising at least one of supported communication transport configuration information for the apparatus, power status information for the apparatus, processing load information for the apparatus, communication load information for the apparatus, proximate interference information for the apparatus and user preferences configured in the apparatus;

means for responding to the inquiry, the response comprising the characteristic information;

means for receiving further wireless communication in the apparatus, the further wireless communication including a configuration;

means for implementing the configuration in the apparatus; and means for establishing communication in accordance with the configuration.

* * * * *